(12) United States Patent
Wang et al.

(10) Patent No.: US 8,532,012 B2
(45) Date of Patent: Sep. 10, 2013

(54) METHODS AND DEVICES FOR SCALABLE RECEPTION IN WIRELESS COMMUNICATION SYSTEMS

(75) Inventors: Chun-Yen Wang, Hsinchu (TW); Chang-Lung Hsiao, Hsinchu (TW); Tzu-Ming Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1022 days.

(21) Appl. No.: 12/325,540

(22) Filed: Dec. 1, 2008

(65) Prior Publication Data

US 2009/0147720 A1    Jun. 11, 2009

Related U.S. Application Data

(60) Provisional application No. 60/996,838, filed on Dec. 7, 2007.

(51) Int. Cl.
*H04H 20/71* (2008.01)

(52) U.S. Cl.
USPC .......................................... 370/312; 370/474

(58) Field of Classification Search
USPC ......... 370/312, 328, 335–336, 338, 342–343, 370/345, 432, 441–442, 465, 473–474, 476, 370/479–480
See application file for complete search history.

(56) References Cited

U.S. PATENT DOCUMENTS

| 6,895,216 B2 | 5/2005 | Sato et al. |
| 7,350,125 B2 * | 3/2008 | Jang et al. ..................... 714/748 |
| 7,366,254 B2 | 4/2008 | Chang et al. |
| 7,620,872 B2 * | 11/2009 | Kwon et al. .................. 714/751 |
| 2004/0028020 A1 | 2/2004 | Frederiksen et al. |
| 2005/0122898 A1* | 6/2005 | Jang et al. ..................... 370/218 |
| 2006/0064625 A1* | 3/2006 | Klein et al. .................... 714/776 |
| 2007/0064707 A1 | 3/2007 | Pandel et al. |
| 2007/0174480 A1* | 7/2007 | Cheung et al. ................ 709/233 |
| 2007/0232366 A1* | 10/2007 | Chen et al. .................... 455/574 |
| 2007/0288834 A1* | 12/2007 | Crozier et al. ................ 714/790 |
| 2008/0232401 A1* | 9/2008 | Ahmadi et al. ............... 370/469 |
| 2008/0320353 A1* | 12/2008 | Blankenship et al. ........ 714/746 |
| 2009/0207781 A1* | 8/2009 | Sidi et al. ..................... 370/328 |

(Continued)

FOREIGN PATENT DOCUMENTS

| EP | 0 963 082 A2 | 12/1999 |
| EP | 1 211 838 A1 | 6/2005 |

OTHER PUBLICATIONS

Extended European Search Report dated May 6, 2010 for corresponding European Patent Application No. 08253886.9 (6 pages), including European Search Report and European Search Opinion.

A.M.C. Correia et al., "Multi-Resolution Broadcast/Multicast Systems for MBMS," IEEE trans. Broadcasting, vol. 53, No. 1, Mar. 2007.

*Primary Examiner* — Kevin Mew
(74) *Attorney, Agent, or Firm* — Finnegan, Henderson, Farabow, Garrett & Dunner, LLP

(57) ABSTRACT

Methods and apparatuses for reception of point-to-multipoint (PTM) transmissions in a wireless communication system including a set of receiving devices. The method includes receiving location information respectively associated with each of a plurality of PTM data versions, and retrieving the plurality of PTM data versions using the location information. The method also includes combining the retrieved plurality of PTM data versions to generate a combined PTM data version, and decoding the combined PTM data version.

70 Claims, 11 Drawing Sheets

(56) References Cited

U.S. PATENT DOCUMENTS

2009/0252070 A1* 10/2009 Connors et al. .............. 370/311
2009/0296624 A1* 12/2009 Ryu et al. ..................... 370/312
2010/0192037 A1*  7/2010 Kuri et al. .................... 714/752
2010/0278093 A1* 11/2010 Wang et al. .................. 370/312
2012/0069796 A1*  3/2012 Casaccia et al. ............. 370/328
2012/0314655 A1* 12/2012 Xue et al. ..................... 370/328
2013/0021969 A1*  1/2013 Ho et al. ....................... 370/328

* cited by examiner

METHODS AND DEVICES FOR SCALABLE RECEPTION IN WIRELESS COMMUNICATION SYSTEMS

PRIORITY

This application claims the benefit of priority of U.S. Provisional Application No. 60/996,838, filed Dec. 7, 2007, which is incorporated by reference herein in its entirety for any purpose.

TECHNICAL FIELD

The present disclosure relates generally to methods and devices for communication systems and, more particularly, to methods and devices for scalable transmission and reception in wireless communication systems.

BACKGROUND

Wireless communication systems allow wireless devices to communicate without the necessity of wired connections. Because wireless systems have become so integrated into daily life, there is a growing demand for wireless communication systems that support multimedia services such as speech, audio, video, file and web downloading, and the like. Various wireless communication protocols have been developed to meet the growing demands of multimedia services over wireless communication networks and to improve the performance of these multimedia services.

One such protocol is Wideband Code Division Multiple Access (W-CDMA), which is promulgated by the $3^{rd}$ Generation Partnership Project (3GPP™), a collaboration of numerous standards development organizations. W-CDMA is a wideband spread-spectrum mobile air interface that uses a direct sequence Code Division Multiple Access (CDMA). Wireless systems, such as those implementing W-CDMA, may utilize a Media Access Control (MAC) frame format based on the IEEE 802.16 family of standards using Orthogonal Frequency-Division Multiple Access (OFDMA).

An exemplary transmission control mechanism for transmitting packet data units (PDUs) in wireless systems is Hybrid Automatic Repeat Request (HARQ). Using HARQ, the devices of a wireless system (e.g., transmitting devices, receiving devices, relay devices, etc.) may be configured to retransmit PDUs when the PDU is either not received by the intended recipient or received with errors. The HARQ transmission control mechanism may use a combination of ACKs, NACKs, and timeouts to communicate the status of transmitted data. Exemplary HARQ protocols may include Stop-And-Wait (SAW), Go-Back-N, and Selective Repeat.

When a transmitting device receives a NACK, the transmitting device may use a retransmission mechanism to retransmit the data. Generally, there are two main variants of HARQ retransmission mechanisms supported in a wireless system employing W-CDMA: incremental redundancy (IR) and chase combining. Using IR, a physical (PHY) layer will encode the HARQ packet thereby generating several versions of encoded subpackets, called Redundancy Versions (RVs). In IR, the encoding process may include the steps of encoding, interleaving, and puncturing, and multiple RVs may be created when the HARQ packet passes through these steps. For chase combining, the PHY layer also encodes the HARQ packet. However, only one version of the encoded packet is generated. Thus, in chase combining, the transmitting device retransmits the same encoded version every time retransmission is required.

Using SAW and an IR encoding scheme, for example, the transmitting device may wait for either an acknowledgment (ACK) or negative acknowledgment (NACK) before respectively transmitting or retransmitting further PDUs. More specifically, the success or failure of receiving and/or decoding the PDU may be determined by a receiving device and reported to a transmitting device via ACK or NACK signaling. When retransmission is required, the transmitting device may utilize successively more robust modulation and coding schemes (MCS) to increase a likelihood that the PDU may successfully be decoded by the receiving device.

Different levels of MCSs may also be used based on known transmission and/or channel quality information. For example, when performing point-to-point (PTP) transmissions of PDUs (i.e., from a transmitting device to a single receiving device), a transmitting device may modulate and code a transmission packet for a receiving device based on channel quality information received from the receiving device. Generally, one of the greatest impacts to channel quality is the distance between the transmitting device and the receiving device. FIG. 1a is a diagram illustrating exemplary types of modulation and coding that a transmitting device may use to send PTP transmission of HARQ PDUs to different receiving devices within its broadcast range based on their respective distances from the transmitting device. Referring to FIG. 1a, for example, transmitting device 110 may encode and modulate transmission packets destined for receiving devices within a first broadcast range A using a less robust MCS (e.g., 64-QAM). However, transmitting device 110 may encode and modulate transmission packets destined for receiving devices within a second broadcast range B using a more robust transmission MCS than for receiving devices within broadcast range A (e.g., 16-QAM), and encode and modulate transmission packets destined for receiving devices within a broadcast range C using a more robust MCS than for receiving devices within either of broadcast ranges A or B (e.g., QPSK MCS).

FIG. 1b is a diagram illustrating PTP transmission of HARQ PDUs using the different types of modulation and coding as discussed above in connection with FIG. 1a. Referring to FIG. 1b, for PTP transmissions, transmitting device 110 may transmit packet data to receiving device 120a, which is in a first broadcast range A, encoded and modulated according to a 64-QAM MCS. When receiving device 120a successfully receives and decodes the packet data, it may send an ACK to transmitting device 110, signaling to transmitting device 110 that new packet data may be transmitted. If, however, receiving device 120a does not successfully receive and decode the packet data, receiving device 120a may send a NACK to transmitting device 110, signaling transmitting device 110 to retransmit the packet data. In some cases, transmitting device 110 may increase the MCS level for subsequent retransmissions of the packet data, increasing the probability that the packet data may be successfully received and decoded.

With regard to receiving devices 120b and 120c respectively positioned in broadcast range B and broadcast range C, transmitting device 110 may transmit packet data to receiving device 120b encoded and modulated according to a 16-QAM MCS, and transmit packet data to receiving device 120c encoded and modulated according to a QPSK MCS. When receiving devices 120b and 120c successfully receive and decode the packet data, they may respectively send ACKs to transmitting device 110, signaling to transmitting device 110 that new packet data may be transmitted. If, however, receiving devices 120b and 120c do not successfully receive and decode the packet data, receiving devices 120b and 120c may respectively send NACKs to transmitting device 110, signaling transmitting device 110 to retransmit the packet data. In some cases, transmitting device 110 may increase the MCS level for subsequent retransmissions of the packet data.

FIG. 2 is a diagram illustrating point-to-multipoint (PTM) transmissions of HARQ PDUs (i.e., from a transmitting device to multiple receiving devices). In PTM, a transmitting device 210 transmits blocks of data using a common radio resource, and instructs a group of receiving devices 220, e.g., receiving devices 220a, 220b, and 220c, to receive the transmitted blocks of data at the same time. PTM transmissions may be used by transmitting device 210 for broadcasting and/or multicasting of packet data.

When performing PTM transmissions, because of the different downlink channel conditions experienced by each of receiving devices 220, transmitting device 210 may need to adopt the most robust modulation and coding schemes for transmission. Specifically, in order to provide every receiving device 220 with an opportunity to correctly receive and decode the packet data, transmitting device 210 may adopt the most robust modulation and coding scheme capable of successfully transmitting packet data to every member of the group of receiving devices 220. To do so, transmitting device 210 may evaluate channel conditions between itself and each of receiving devices 220 and, based on the evaluated channel quality information, determine a modulation and coding scheme for the group of receiving devices 220 within its broadcast range.

For example, referring to FIG. 2, although receiving devices 220a and 220b may be able to receive transmissions that are less robustly encoded and modulated (e.g., 64-QAM for transmissions to receiving device 220a, and 16-QAM for transmissions to receiving device 220b), receiving device 220c may have poor channel quality and thus may require more robust encoding and modulation (e.g., QPSK). Thus, to ensure that all receiving devices 220 are able to receive and decode PTM transmissions, transmitting device 210 may encode and modulate PTM transmissions according to a QPSK MCS. As a result, however, receiving devices 220 having good channel conditions may use unnecessary battery power to retrieve and decode the PTM data.

When receiving devices 220a, 220b, and 220c successfully receive and decode the packet data, they may respectively send ACKs to transmitting device 210, signaling to transmitting device 210 that new packet data may be transmitted. If, however, any of receiving devices 220a, 220b, or 220c do not successfully receive and decode the packet data, that receiving device 220 may send a NACK to transmitting device 210, signaling transmitting device 210 to retransmit the packet data. When retransmission is required, transmitting device 210 may again send the packet data at the most robust MCS Because the transmitting device may wait for either an ACK or NACK before transmitting and/or retransmitting, there may be significant delays and wasted resources for both the transmitting device and any receiving devices. Furthermore, because a transmitting device may use a more robust modulation and coding scheme than is necessary for every receiving device in its range, receiving devices that could successfully receive data transmitted using a less robust modulation and coding scheme may unnecessarily spend resources decoding data transmitted using a more robust modulation and coding scheme.

The disclosed embodiments are directed to overcoming one or more of the problems set forth above.

SUMMARY OF THE INVENTION

In one exemplary embodiment, the present disclosure is directed to a method for point-to-multipoint (PTM) transmission in a wireless communication system including a set of receiving devices, comprising: encoding, by a transmission device, a plurality of PTM data bits to generate a plurality of PTM data versions; transmitting, to the set of receiving devices, the plurality of PTM data versions; and transmitting, to the set of receiving devices, location information for each of the plurality of PTM data versions.

In another exemplary embodiment, the present disclosure is directed to an apparatus for point-to-multipoint (PTM) transmission in a wireless communication system, the apparatus comprising: at least one memory to store data and instructions; and at least one processor configured to access the at least one memory and, when executing the instructions, to: encode a plurality of PTM data bits to generate a plurality of PTM data versions; initiate transmission, to the set of receiving devices, the plurality of PTM data versions; and initiate transmission, to the set of receiving devices, location information for each of the plurality of PTM data versions.

In another exemplary embodiment, the present disclosure is directed to a method for reception of point-to-multipoint (PTM) transmissions in a wireless communication system including a set of receiving devices, comprising: receiving, by a receiving device of the set of receiving devices, location information respectively associated with each of a plurality of PTM data versions; retrieving the plurality of PTM data versions using the location information; combining the retrieved plurality of PTM data versions to generate a combined PTM data version; and decoding the combined PTM data version.

In another exemplary embodiment, the present disclosure is directed to an apparatus for reception of point-to-multipoint (PTM) transmissions in a wireless communication system including a set of wireless devices, the apparatus comprising: at least one memory to store data and instructions; and at least one processor configured to access the at least one memory and, when executing the instructions, to: receive location information respectively associated with each of a plurality of PTM data versions; retrieve the plurality of PTM data versions using the location information; combine the retrieved plurality of PTM data versions to generate a combined PTM data version; and decode the combined PTM data version.

In another exemplary embodiment, the present disclosure is directed to a method for reception of point-to-multipoint (PTM) transmissions in a wireless communication system including a set of receiving devices, comprising: retrieving, by a receiving device of the set of receiving devices, a first version of a plurality of PTM data packets, wherein the first version is included in a plurality of PTM versions; determining, based on one or more transmission conditions, if one or more second versions of the plurality of PTM data packets are to be retrieved, wherein the one or more second versions are included in the plurality of PTM versions; storing, if it is determined to retrieve the one or more second versions, the first version; retrieving the one or more second versions; combining the one or more second versions with the first version to generate a combined version; and decoding the combined version.

In another exemplary embodiment, the present disclosure is directed to an apparatus for reception of point-to-multipoint (PTM) transmissions in a wireless communication system including a set of receiving devices, the apparatus comprising: at least one memory to store data and instructions; and at least one processor configured to access the at least one memory and, when executing the instructions, to: retrieve a first version of a plurality of PTM data packets to be retrieved, wherein the first version is included in a plurality of PTM versions; determine, based on one or more transmission or channel conditions, if one or more second versions of the plurality of PTM data packets are to be retrieved, wherein the one or more second versions are included in the plurality of PTM versions; store, if it is determined to retrieve the one or more second versions, the first version in the at least one memory; retrieve the one or more second versions; combine the one or more second versions with the first version to generate a combined version; and decode the combined version.

DETAILED DESCRIPTION

Figure 1A:
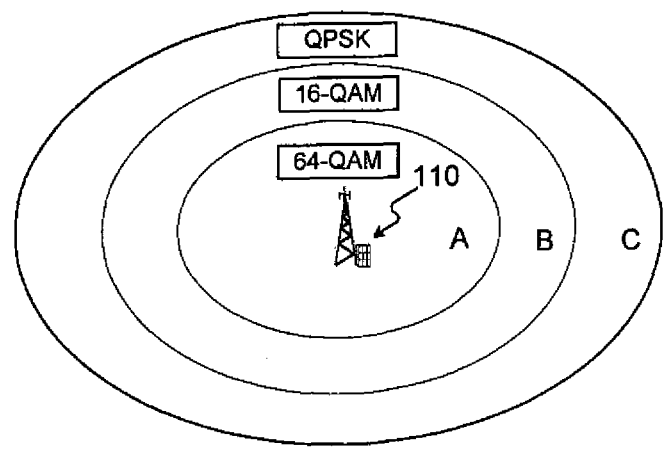
FIG. 1a is a diagram illustrating point-to-point (PTP) communication in an exemplary wireless communication system.
Figure 1B:
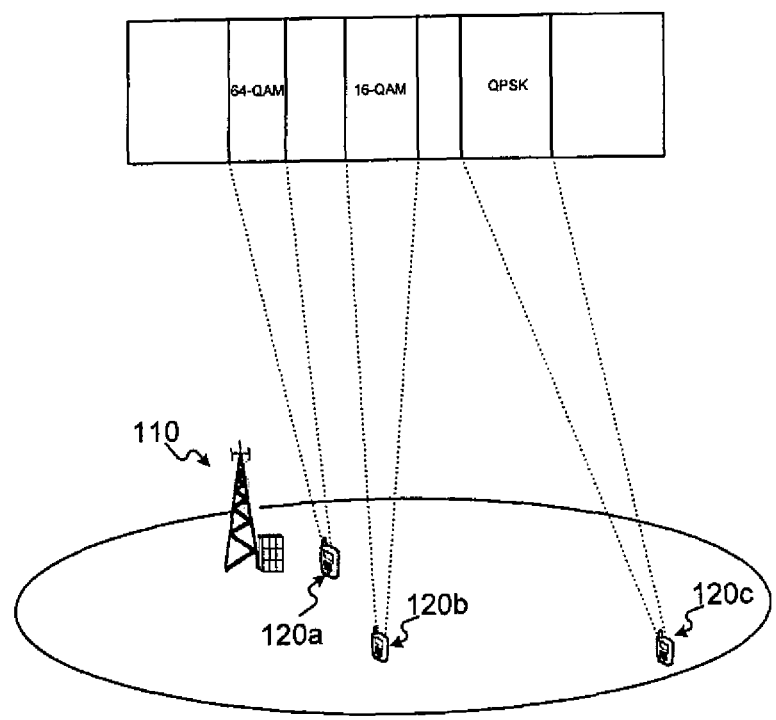
FIG. 1b is a diagram illustrating PTP communication in an exemplary wireless communication system.
Figure 2:
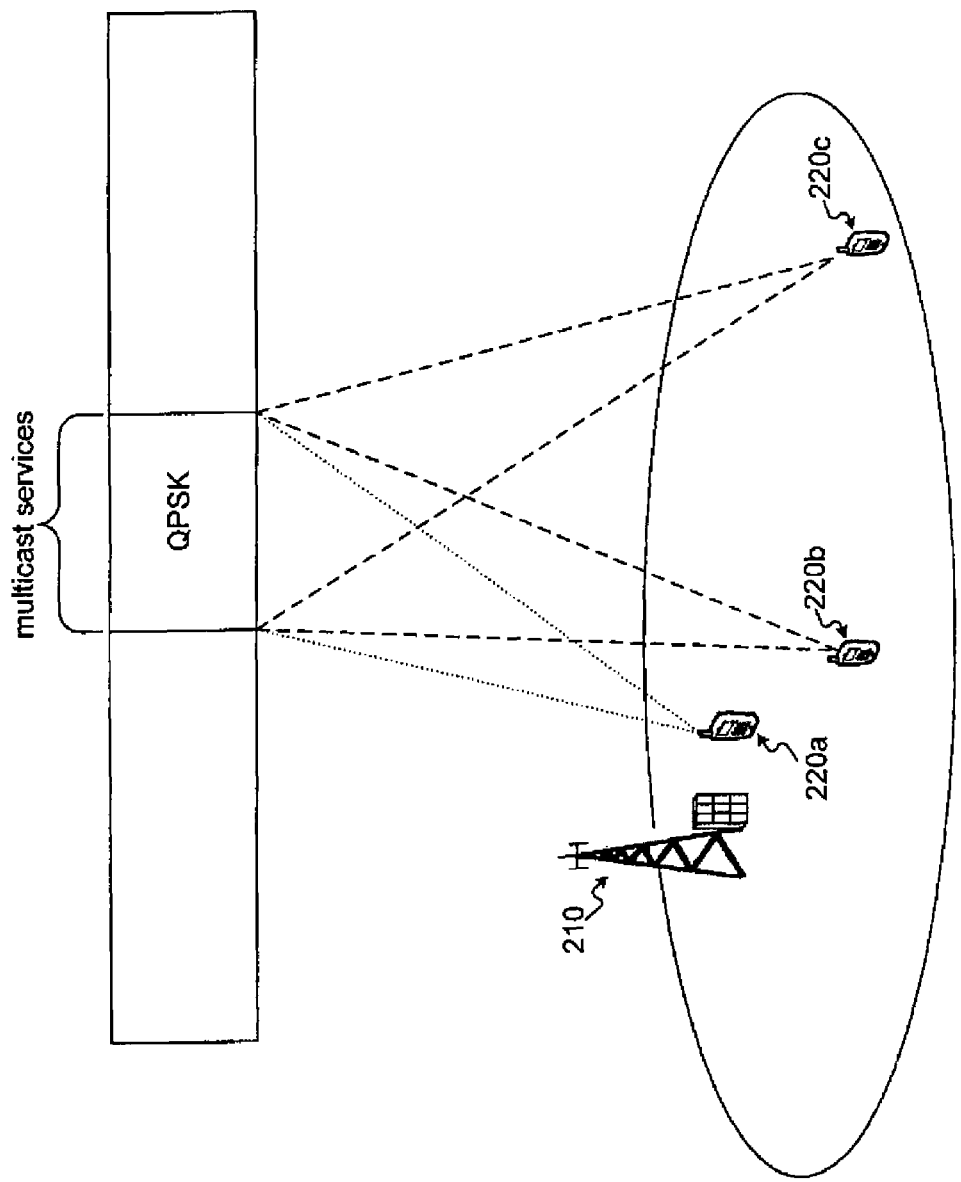
FIG. 2 is a diagram illustrating point-to-multipoint (PTM) communication in an exemplary wireless communication system.
Figure 3:
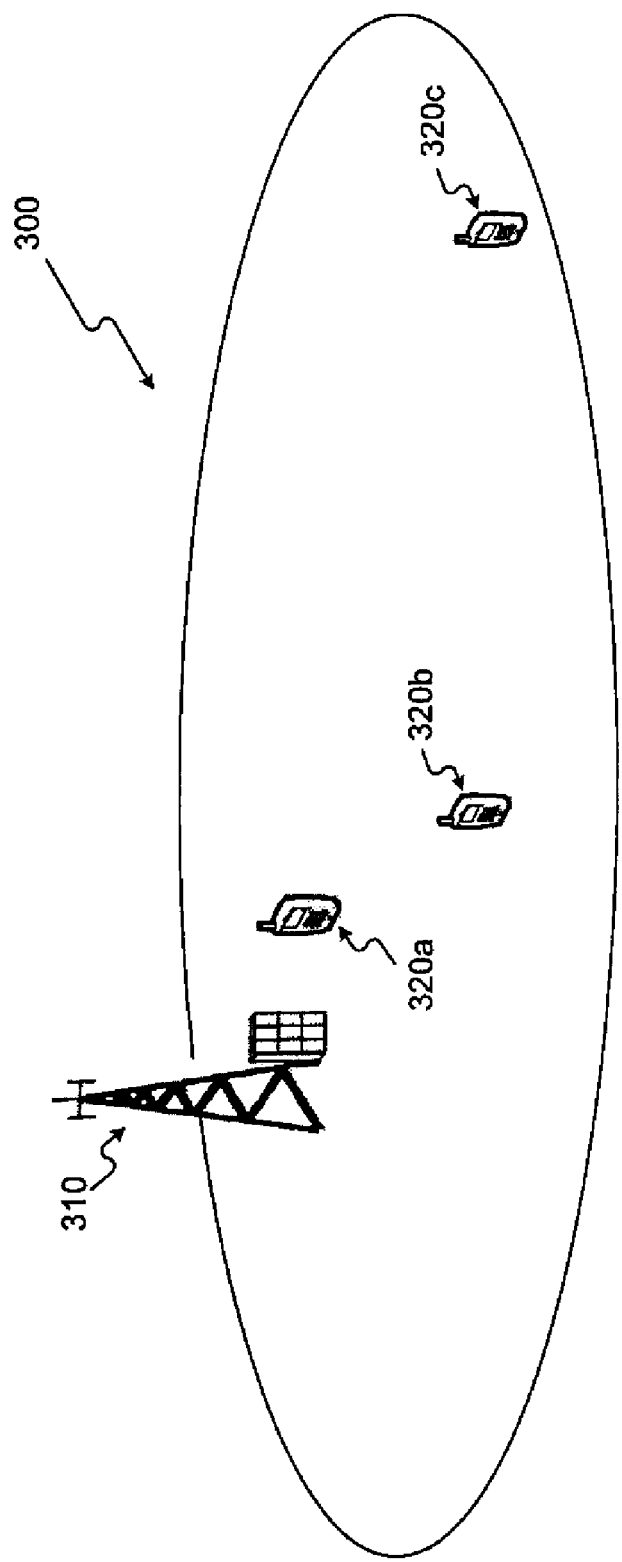
FIG. 3 is a diagram illustrating PTM communication in an exemplary wireless communication system, consistent with certain disclosed embodiments.

FIG. 3 is a diagram of an exemplary wireless communication system 300. The exemplary wireless communication system 300 of FIG. 3 may be based, for example, on the Institute of Electrical and Electronics Engineers (IEEE) 802.16 family of standards. As shown in FIG. 3, wireless communication system 300 may include one or more transmitting devices (TD) 310, e.g., TD 310, and one or more subscriber stations (SS) 320, e.g., SS 320a, SS 320b, and SS 320c.

TD 310 may be any type of communication device configured to transmit and/or receive data and/or communications to and from one or more SSs 320 in wireless communication system 300, many of which are known in the art. In some embodiments, TD 310 may also be referred to as, for example, a Node-B, a base transceiver system (BTS), an access point, etc. In other embodiments, TD 310 may be a relay station, an intermediate node, or an intermediary. In one exemplary embodiment, TD 310 may have a broadcast/reception range within which TD 310 may wirelessly communicate with one or more one or more SSs 320. Broadcast ranges may vary due to power levels, location, and interference (physical, electrical, etc.).

Figure 4A:
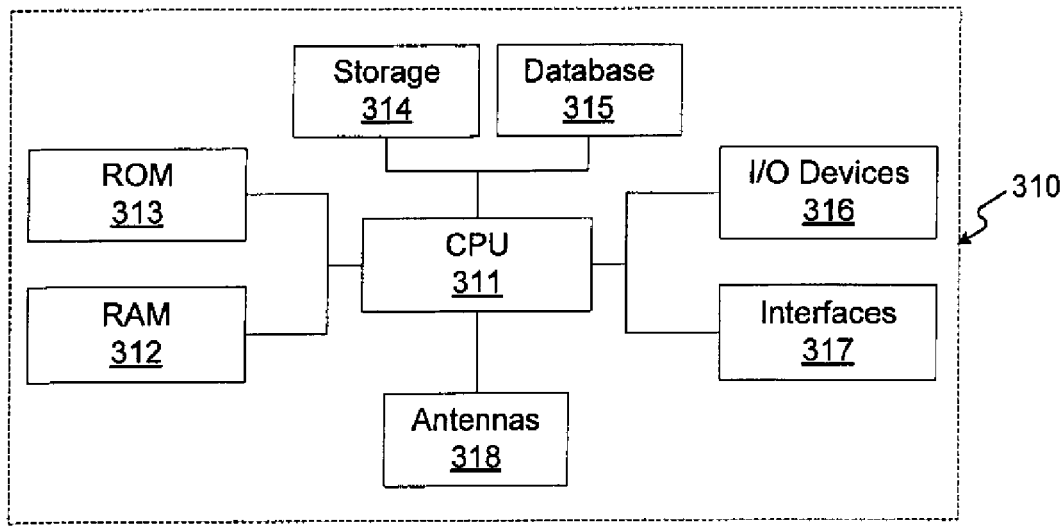
FIG. 4a is a diagram of an exemplary transmitting device (TD), consistent with certain disclosed embodiments.

FIG. 4a is a diagram of an exemplary TD 310, consistent with certain disclosed embodiments. As shown in FIG. 4a, each TD 310 may include one or more of the following components: at least one central processing unit (CPU) 311 configured to execute computer program instructions to perform various processes and methods, random access memory (RAM) 312 and read only memory (ROM) 313 configured to access and store information and computer program instructions, memory 314 to store data and information, databases 315 to store tables, lists, or other data structures, I/O devices 316, interfaces 317, antennas 318, etc. Each of these components is well-known in the art and will not be discussed further.

Although not shown, TD 310 may include one or more mechanisms and/or devices by which TD 310 may perform the methods described herein. For example, TD 310 may include one or more encoders, one or more interleavers, one or more circular buffers, one or more multiplexers, one or more permuters, one or more arithmetic logic units and/or their constituent parts, etc. These mechanisms and/or devices may include any combination of hardware and/or software components and may be included, in whole or in part, in any of the components shown in FIG. 4a.

SS 320 may be any type of computing device configured to wirelessly transmit and/or receive data to and from TD 310 in wireless communication system 300. SS 320 may include, for example, servers, clients, desktop computers, laptop computers, network computers, workstations, personal digital assistants (PDA), tablet PCs, scanners, telephony devices, pagers, cameras, musical devices, etc. In addition, SS 320 may include one or more wireless sensors in a wireless sensor network configured to communicate by means of centralized and/or distributed communication. In one exemplary embodiment, SS 320 may be a mobile computing device. In another exemplary embodiment, SS 320 may be a fixed computing device operating in a mobile environment, such as, for example, a bus, a train, an airplane, a boat, a car, etc.

Figure 4B:
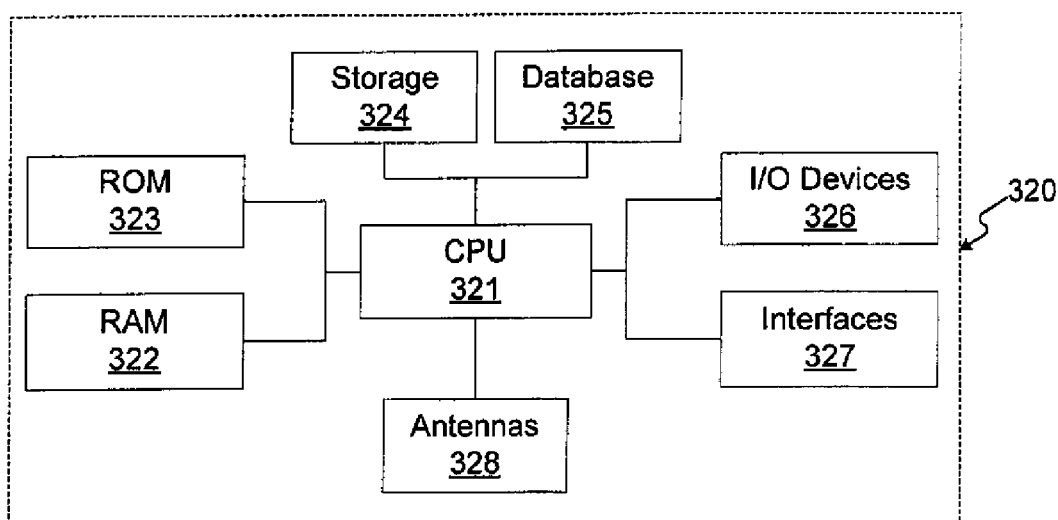
FIG. 4b is a diagram of an exemplary subscriber station (SS), consistent with certain disclosed embodiments.

FIG. 4b is a diagram of an exemplary SS 320, consistent with certain disclosed embodiments. As shown in FIG. 4b, each SS 320 may include one or more of the following components: at least one central processing unit (CPU) 321 configured to execute computer program instructions to perform various processes and methods, random access memory (RAM) 322 and read only memory (ROM) 323 configured to access and store information and computer program instructions, memory 324 to store data and information, databases 325 to store tables, lists, or other data structures, I/O devices 326, interfaces 327, antennas 328, etc. Each of these components is well-known in the art and will not be discussed further.

Although not shown, SS 320 may include one or more mechanisms and/or devices by which SS 320 may perform the methods as described herein. For example, SS 320 may include one or more encoders, one or more interleavers, one or more circular buffers, one or more multiplexers, one or more permuters, one or more arithmetic logic units and/or their constituent parts, etc. These mechanisms and/or devices may include any combination of hardware and/or software components and may be included, in whole or in part, in any of the components shown in FIG. 4b.

In exemplary wireless communication system 300 of FIG. 3, transmissions between TD 310 and SSs 320 may be divided into variable length sub-frames: an uplink (UL) sub-frame and a downlink (DL) sub-frame. Generally, the UL sub-frame may include ranging channels, a channel quality information channel (CQICH), and UL data bursts containing data.

The DL sub-frame may include a preamble, a Frame Control Header (FCH), a DL-MAP, a UL-MAP, a Multicast and Broadcast (MBS)-MAP, and a DL data burst area. The preamble may be used to provide a reference for synchronization. For example, the preamble may be used to adjust a timing offset, a frequency offset, and power. The FCH may contain frame control information for each connection including, for example, decode information for the receiving device.

The DL-MAP and UL-MAP may be used to allocate channel access for both uplink and downlink communication. That is, the DL-MAP may provide a directory of access slot locations within the current downlink sub-frame, and the UL-MAP may provide a directory of access slot locations within the current uplink sub-frame. The MBS-MAP may be used to provide a directory of access slot locations for point-to-multipoint (PTM) data bursts. In the DL-MAP and/or MBS-MAP, the directories may take the form of one or more MAP Information Elements (MAP IEs). Each MAP IE in the DL-MAP or MBS-MAP may contain parameters to identify where a data burst may be located, the length of the data burst, the identity of the intended recipient of the data burst, and one or more transmission parameters.

For example, each MAP IE in the DL-MAP and/or MBS-MAP may contain a Connection ID (CID), identifying the destination device for which a data burst is intended, a Downlink Interval Usage Code (DIUC), representing a downlink interval usage code by which downlink transmission is defined, an OFDMA Symbol Offset, indicating the offset of the OFDMA symbol in which a data burst starts, a sub-channel offset, indicating the lowest-index OFDMA sub-channel for carrying the burst, etc. Other parameters may also be included in the MAP IE such as, for example, a boosting parameter, a parameter indicating a number of sub-channels, a parameter indicating a number of OFDMA symbols, etc. An OFDMA symbol may be the number of carriers equal to the size of a Fourier transform, and may be constructed from data carriers, pilot carriers, null carriers, etc.

The DL-MAP and UL-MAP may each be followed by the data burst area. The data burst area may include one or more data bursts. Each data burst in the data burst area may be modulated and encoded according to the control type of a corresponding connection-switched control data. Generally, the DL-MAP, the UL-MAP, and the MBS-MAP may be referred to as packet data units (PDUs) or simply packet data. PDUs may be used to transmit data point-to-point (PTP) and/or point-to-multipoint (PTM).

Figure 5:
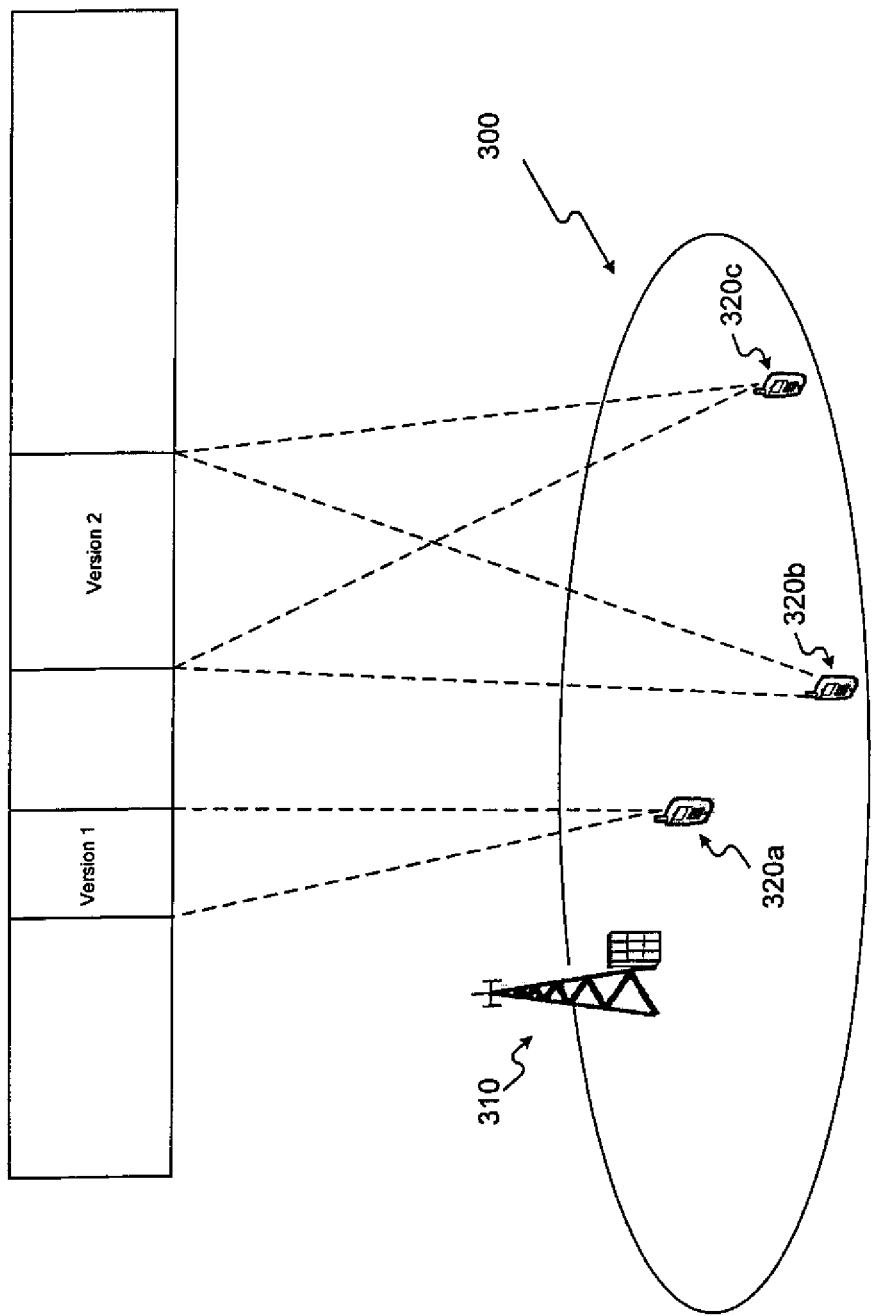
FIG. 5 is a diagram illustrating an exemplary PTM transmission and reception, consistent with certain disclosed embodiments.

FIG. 5 is an exemplary diagram illustrating PTM data transmission in wireless communication system 300, consistent with certain disclosed embodiments. As shown in FIG. 5, a transmitting device (e.g., TD 310) may encode and modulate multiple versions (e.g., Version 1, Version 2) of the same PTM data for transmission to a plurality of receiving devices (e.g., SS 320a, SS 320b, and SS 320c). In some embodiments, TD 310 may transmit the multiple versions without waiting for an ACK or NACK from SSs 320.

Each SS 320 may, in turn, choose a version of the encoded and modulated data to retrieve from the transmitted PDUs. In one exemplary embodiment, SSs 320 may each choose a version of data to retrieve based on their individual channel quality information, thus choosing a version that allows each SS 320 to correctly retrieve the transmission data while using the least amount of power and resources. The data versions may be retrieved from one or more data bursts in a radio frame.

In FIG. 5, for example, SS 320a may be closer in distance to TD 310 and have little or no interference. Therefore, SS 320a may require a version of data that is modulated and encoded according to a first modulation and coding scheme (MCS), and SS 320a may choose to retrieve Version 1 of the transmission data. In contrast, SS 320b and SS 320c may be further in distance from TD 310 and may have higher levels of interference than that of SS 320a. Therefore, SS 320b and SS 320c may require a version of data that is modulated and encoded according to a second MCS, and SS 320b and SS 320c may choose to retrieve Version 2 of the transmission data.

TD 310 may use any appropriate data recovery scheme, including, for example, incremental redundancy (IR), chase combining, etc. In one exemplary embodiment, TD 310 may use an IR encoding scheme. Thus, in one exemplary embodiment, PTM data versions may be redundancy versions (RVs), and may be created using an incremental redundancy (IR) encoding scheme.

Using IR, a physical (PHY) layer will encode the PTM data transmission thereby generating several versions of encoded subpackets, called Redundancy Versions (RVs). In IR, the encoding process may include the steps of encoding, interleaving, and puncturing, and multiple RVs may be created when the HARQ packet passes through the steps of encoding, interleaving, and puncturing. Generally, puncturing is a method used to reduce the number of codeword bits and increase the rate of the code. Thus, when performing puncturing, specific sequences of symbols are selected from the interleaved output sequence. The resulting subpacket sequence is a binary sequence of symbols for output to a modulator and subsequent transmission to a receiving device. By using different puncturing mechanisms, each RV may include additional coded bits from the PTM data transmission. Different RVs may be combined together for decoding at a receiving device.

Figure 6:
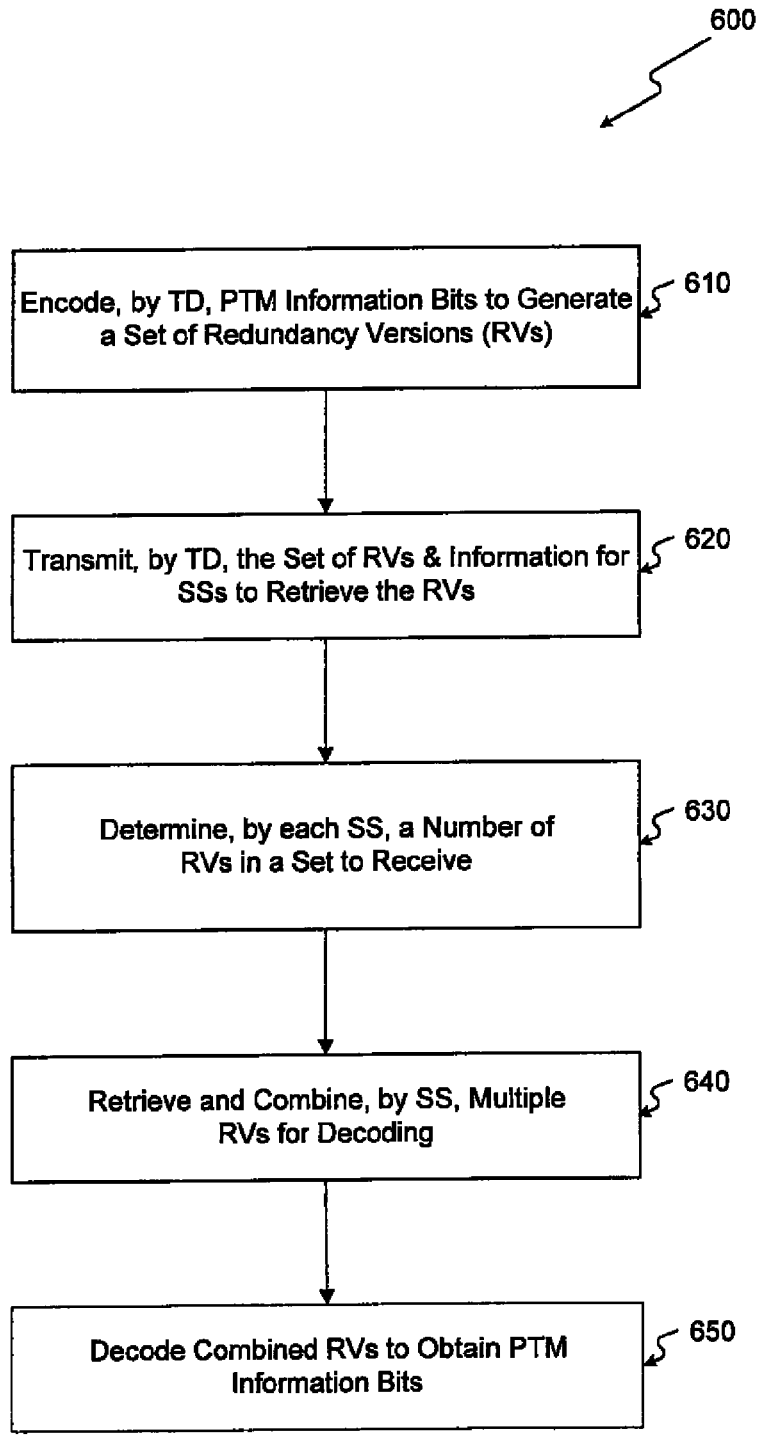
FIG. 6 is a flowchart illustrating an exemplary PTM transmission and reception, consistent with certain disclosed embodiments.

FIG. 6 is an exemplary flowchart 600 illustrating PTM data transmission in a wireless communication system, such as wireless communication system 300, consistent with certain disclosed embodiments. Specifically, FIG. 6 illustrates an embodiment in which a transmitting device (e.g., TD 310) generates a set of RVs (e.g., RV0, RV1, RV2, etc.), and each receiving device (e.g., SS 320a, SS 320b, SS 320c, etc.) determines the number of RVs to retrieve based on its channel conditions. In the embodiment of FIG. 6, TD 310 may not wait for an ACK or NACK before retransmitting the current RV or transmitting any subsequently generated RV. PTM transmissions may include broadcast and multicast transmissions.

In addition, while three RVs are discussed, the number of RVs in a set may be more or less. In some embodiments, the number of RVs may be predetermined. In other embodiments, the number of RVs in a set may be determined dynamically. For example, TD 310 may determine the number of RVs to generate based on one or more transmission and channel conditions reported from one or more receiving devices (e.g., SS 320a, SS 320b, SS 320c, etc.). Transmission and channel conditions may include, for example, measured signal strength, channel quality indicator (CQI), signal to interference plus noise ratio (SINR), bit error rate (BER), block error rate (BLER), packet error rate, etc.

In some embodiments, the number of OFDMA symbols for each RV in a set of RVs may be the same (e.g., the number of OFDMA symbols in RV0 is equal to the number of OFDMA symbols in RV1, etc.). In other embodiments, the number of OFDMA symbols for each RV in a set of RVs may be different (e.g., the number of OFDMA symbols in RV0 is not equal to the number of OFDMA symbols in RV1, etc.).

When TD 310 has PTM information bits for PTM transmission, TD 310 may encode the PTM information bits using one or more data recovery schemes to generate multiple RVs (610). For example, TD 310 may generate a set of RVs (e.g., RV0, RV1, RV2, etc.) by passing the PTM information bits through the IR processes (e.g., CTC encoder, interleaver, puncture, modulator, etc.). Each of these RVs may be modulated by any combination of modulation scheme (e.g., BPSK, QPSK, 16-QAM, 64-QAM, etc.) and coding rate (e.g., ½, ⅓, ⅔, etc.) to provide different levels of robustness. In some embodiments, each of the RVs may be modulated according to a same modulation scheme and/or coding rate. In other embodiments, one or more of the RVs may have a modulation scheme and/or coding rate that is different than one or more other RVs.

Once TD 310 has encoded and modulated the PTM information bits to achieve a set of RVs, TD 310 may transmit the set of RVs to one or more receiving devices (e.g., SS 320a, SS 320b, SS 320c, etc.) (620). In some embodiments, the set of RVs may be sent in an order corresponding to their sequence order (e.g., RV0, RV1, RV2, etc.). In other embodiments, the set of RVs may be sent in an order different than their sequence order (e.g., RV0, RV2, RV1, etc.). In some embodiments, the RVs in a set of RVs may be sent by using time division multiplexing (TDM). In some embodiments, the RVs in a set of RVs may be sent by using frequency division multiplexing (FDM). In other embodiments, the RVs in a set of RVs may be sent by using hybrid TDM and FDM. In addition, the set of RVs may all be sent on a same channel or on different channels.

In addition, TD 310 may provide information for each of the one or more SSs 320 to locate and retrieve the transmitted set of RVs within one or more data burst areas. The location information may, for example, be found in a MAC header. In some embodiments, the location information may be provided in one or more MAP IEs (e.g., DL-MAP IEs, MBS-MAP IEs, etc.). In other embodiments, the location information may be provided in multicast control channels. Furthermore, the location information may be in the same PDU that contains one or more RVs of the set of RVs or in any previously transmitted PDU.

SS 320 may retrieve one or more RVs of the set of RVs contiguously and/or separately. For example, while multiple RVs may be sent via multiple PDUs, when retrieving the RVs contiguously, SS 320 may retrieve all the desired RVs during one retrieval. In addition, when retrieving the desired RVs contiguously, SS 320 may make a single determination to retrieve the multiple RVs. In some embodiments, when retrieving RVs contiguously, each SS 320 may, in turn, determine a number of RVs to retrieve (630). A determination of the number of RVs that each SS 320 retrieves may be made based on one or more transmission and/or channel conditions associated with that particular SS 320, including, for example, measured signal strength, CQI, SINR, BER, BLER, packet error rate, etc. In other embodiments, a determination of the number of RVs that each SS 320 retrieves may be made based on one or more previous experiences by that SS 320. For example, an SS 320 may determine the number of RVs to retrieve based on a number of previous RVs utilized for successfully decoding PTM data in one or more previous transmissions.

When retrieving RVs separately, SS 320 may retrieve all the desired RVs, but may attempt to decode a first retrieved RV before deciding to retrieve one or more additional RVs.

That is, SS 320 may retrieve a first RV and, if SS 320 is unable to successfully decode the first RV, SS 320 may decide to retrieve a second RV. Similarly, if SS 320 retrieves the second RV, but is unable to successfully decode the second RV, SS 320 may determine to retrieve a third RV. In some embodiments, SS 320 may determine to selectively retrieve one or more RVs in a sequence (e.g., RV0, RV0 and RV2, RV1 and RV2, etc.). In other embodiments, SS 320 may determine to retrieve the RVs in sequence order (e.g., RV0, RV0 and RV1, RV0 and RV1 and RV2, etc.). SSs 320 may be configured to retrieve the one or more RVs in a sequence order different or the same as any other SS 320. The RVs may be retrieved from one or more data bursts in a radio frame.

Once SS 320 has determined the number of RVs that it will retrieve, SS 320 may retrieve and, in some embodiments, combine the determined RVs (640). Once the RVs are combined, SS 320 may decode the retrieved and combined RVs to obtain the PTM information bits (650). Combination of RVs and decoding may be performed using any method of combining and decoding data, many of which are known in the art.

Figure 7:
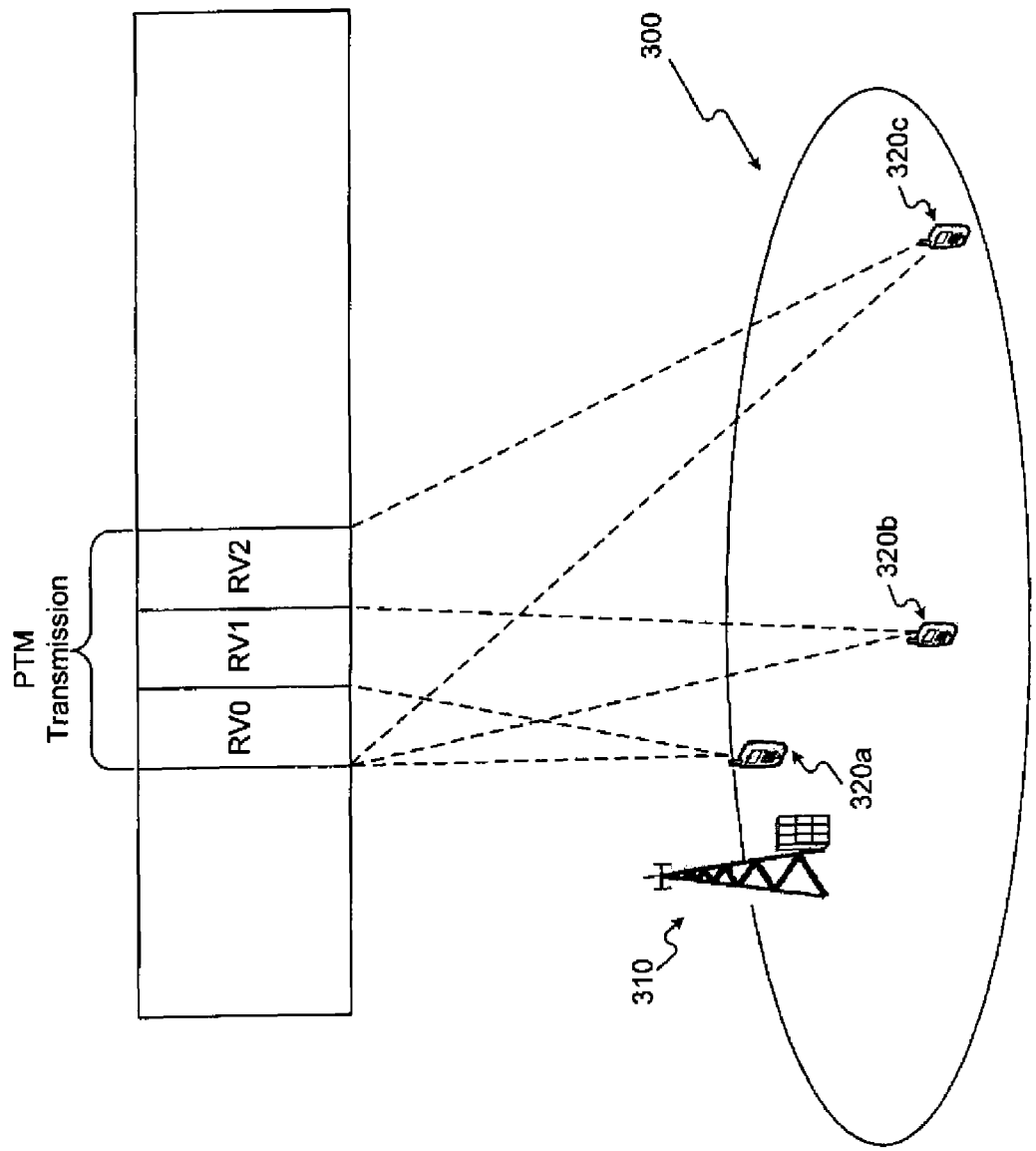
FIG. 7 is a diagram illustrating the exemplary PTM transmission and reception of FIG. 6, consistent with certain disclosed embodiments.

FIG. 7 shows an exemplary diagram of wireless communication system 300 employing the embodiment disclosed above in connection with FIG. 6. As discussed above in connection with 610, TD 310 may encode and transmit a set of RVs, i.e., RV0, RV1, and RV2. SS 320a may evaluate one or more measurements, e.g., signal strength, CQI, SINR, BER, and BLER, and determine that it has high quality transmission and/or channel conditions. Thus, SS 320a may determine that it can correctly decode the PTM information bits using only one RV, e.g., RV0. In contrast, SS 320b may also evaluate one or more measurements, e.g., signal strength, CQI, SINR, BER, and BLER, but may determine that it has lower quality radio link conditions. Thus, SS 320b may determine that it can correctly decode the PTM information bits using two RVs, e.g., RV0 and RV1. SS 320c may also evaluate one or more measurements, e.g., signal strength, CQI, SINR, BER, and BLER, however, SS 320c may determine that it has poor quality radio link conditions. Thus, SS 320c may determine that it can correctly decode the PTM information bits using three RVs, e.g., RV0, RV1, and RV2. Each of SS 320a, SS 320b, and SS 320c may retrieve the RV(s) it has determined to retrieve, and decode the retrieved RV(s). For example, SS 320a may decode RV0 to obtain the PTM information bits, while SS 320b may decode the combination of RV0 and RV1 to obtain the PTM information bits, and SS 320c may decode the combination of RV0, RV1, and RV2 to obtain the PTM information bits.

Figure 8:
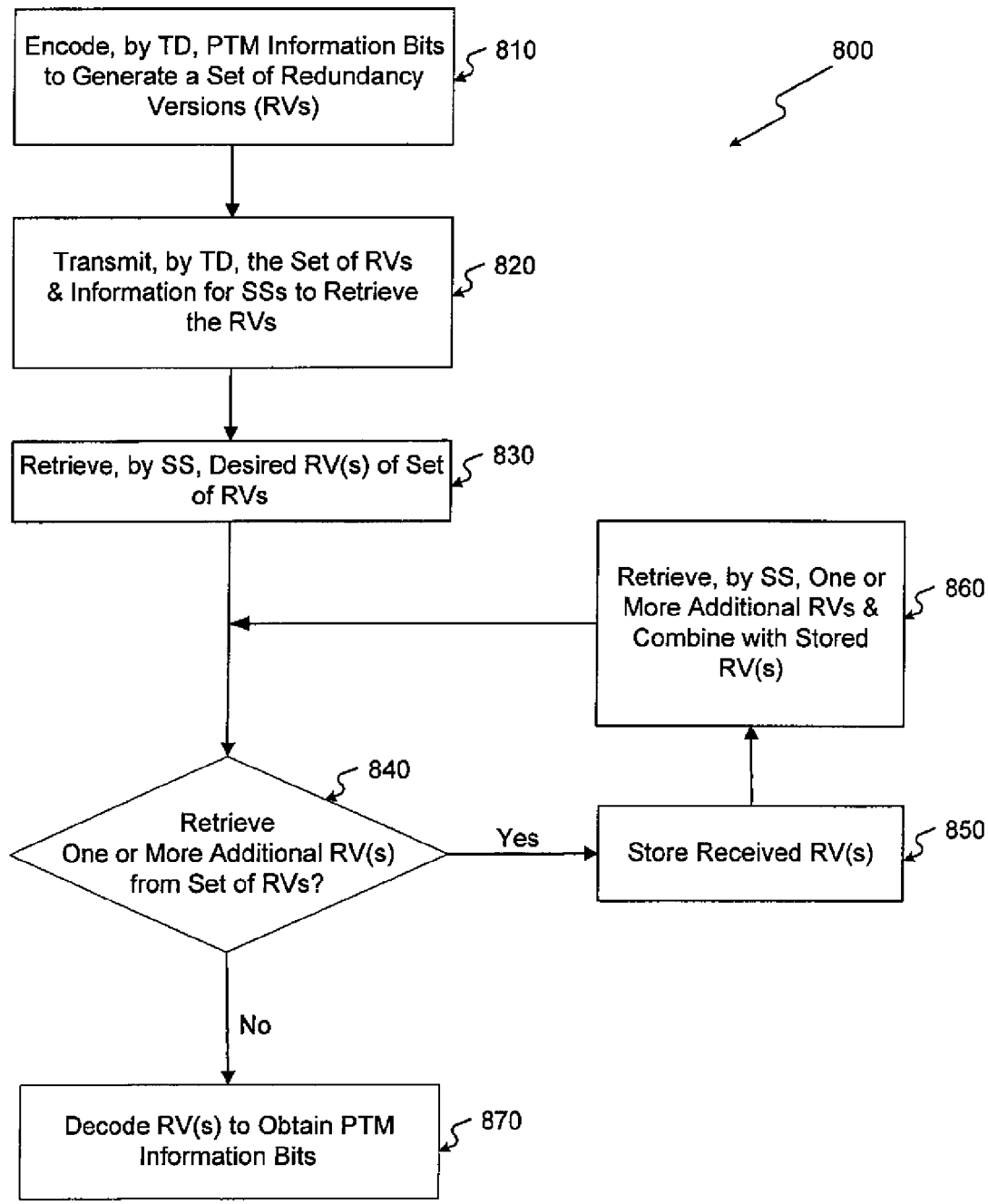
FIG. 8 is a flowchart illustrating an exemplary PTM transmission and reception, consistent with certain disclosed embodiments.

FIG. 8 is an exemplary flowchart 800 illustrating PTM data transmission in a wireless communication system, such as wireless communication system 300, consistent with certain disclosed embodiments. Specifically, FIG. 8 illustrates an embodiment in which a transmitting device (e.g., TD 310) generates a set of RVs, transmitting them contiguously and/or non-contiguously. Each receiving device (e.g., SS 320a, SS 320b, SS 320c, etc.) may determine the number of RVs to retrieve based on evaluations of one or more transmission and/or channel criteria. PTM transmissions may include broadcast and multicast transmissions.

As discussed in connection with FIG. 6, while three RVs are shown, the number of RVs in a set may be more or less. In some embodiments, the number of RVs in a set may be predetermined. In other embodiments, the number of RVs in a set may be determined dynamically. For example, TD 310 may determine the number of RVs to generate based on one or more transmission and/or channel conditions reported by one or more receiving devices (e.g., SS 320a, SS 320b, SS 320c, etc.). Transmission and/or channel conditions may include, for example, measured signal strength, CQI, SINR, BER, BLER, packet error rate, etc. In some embodiments, the number of OFDMA symbols for each PTM data version in a set of PTM data versions may be the same (e.g., the number of OFDMA symbols in RV0 is equal to the number of OFDMA symbols in RV1, etc.). In other embodiments, the number of OFDMA symbols for each PTM data version in a set of PTM data versions may be different (e.g., the number of OFDMA symbols in RV0 is not equal to the number of OFDMA symbols in RV1, etc.).

When TD 310 has PTM information bits for PTM transmission, TD 310 may encode the PTM information bits using one or more data recovery schemes to generate a set of RVs (810). For example, TD 310 may generate a set of redundancy versions (e.g., RV0, RV1, RV2, etc.) by passing the PTM information bits through the IR processes (e.g., CTC encoder, interleaver, puncture, modulator, etc.). Each of these RVs may be modulated by any combination of modulation scheme (e.g., BPSK, QPSK, 16-QAM, 64-QAM, etc.) and coding rate (e.g., ½, ⅓, ⅔, etc.) to provide different levels of robustness for the respective RVs. In some embodiments, each of the RVs may be modulated according to a same modulation scheme and/or coding rate. In other embodiments, one or more of the RVs may have a modulation scheme and/or coding rate that is different than one or more other RVs.

Once TD 310 has encoded and modulated the PTM information bits to achieve a set of RVs, TD 310 may transmit the set of RVs to one or more receiving devices (e.g., SS 320a, SS 320b, SS 320c, etc.) (820). In some embodiments, the set of RVs may be sent in an order corresponding to their sequence order (e.g., RV0, RV1, RV2, etc.). In other embodiments, the set of RVs may be sent in an order different than their sequence order (e.g., RV0, RV2, RV1, etc.). In some embodiments, the RVs in a set of RVs may be sent by using TDM. In some embodiments, the RVs in a set of RVs may be sent by using FDM. In other embodiments, the RVs in a set of RVs may be sent by using hybrid TDM and FDM. In addition, the RVs in a set of RVs may all be sent on a same channel or on different channels. In one exemplary embodiment, TD 310 may send the set of RVs non-contiguously. For example, TD 310 may send the set of RVs with intervening time intervals. In some embodiments, these intervening time intervals may be of sufficient length to allow receiving SSs 320 to retrieve a first RV, and make a determination that one or more additional RVs are desired.

In addition, TD 310 may provide location information for each of the one or more receiving devices to locate and retrieve the transmitted RVs from one or more data bursts. The location information may, for example, be found in a MAC header. In some embodiments, the location information may be provided in one or more MAP IEs. In other embodiments, the location information may be provided in multicast control channels. The location information may be in the same PDU as one or more RVs in the set of RVs or in any previously transmitted PDU.

Each SS 320 may, in turn, retrieve a desired RV (830). In some embodiments, the RV that an SS 320 may desire to retrieve may be predetermined. In other embodiments, a determination of the RV that an SS 320 may desire to retrieve may be made based on one or more transmission and/or channel conditions associated with that particular SS 320, including, for example, measured signal strength, CQI, SINR, BER, BLER, packet error rate, etc. In one exemplary embodiment, an SS 320 may retrieve a first version that is predetermined, whereas the determination of subsequent versions to retrieve may be based on one or more transmission and/or channel conditions.

Once SS 320 has retrieved the desired RV, SS 320 may evaluate the data and determine if one or more additional RVs are desired (840). The determination of whether to retrieve one or more additional RVs may be made based on one or more criteria, including, for example, error detection methods, cyclic redundancy check (CRC), radio link condition, measured signal strength, CQI, SINR, BER, BLER, packet error rate, etc. The determination may be made using the same and/or different transmission and/or channel conditions used previously (e.g., using the same transmission and/or channel conditions as in step 830, using the same transmission and/or channel conditions as in previously retrieved PTM data, etc.). In some embodiments, a determination to retrieve one or more additional PTM data versions may be made because the PTM information bits cannot be correctly decoded using the retrieved RV.

When SS 320 determines that one or more additional RVs are to be retrieved (840, Yes), SS 320 may store the previously retrieved RV in a memory associated with SS 320, e.g., storage 314 (850), and may retrieve one or more additional RVs to combine with the stored RV(s) (860). In some embodiments, SS 320 may make a determination to retrieve additional PTM data versions one version at a time (e.g., RV0, RV1, RV2, etc.). In other embodiments, SS 320 may make a single determination to retrieve multiple PTM data versions (e.g., RV0 and RV1, RV0 and RV1 and RV2, etc.).

After the one or more additional RVs have been retrieved and combined, SS 320 may again make a determination whether to retrieve one or more additional RVs (840). Again, the determination of whether to retrieve one or more additional RVs may be made based on one or more criteria, including, for example, error detection methods, CRC, radio link condition, measured signal strength, CQI, SINR, BER, BLER, packet error rate, etc. When SS 320 determines that one or more additional RVs are not desired (840, No), SS 320 may decode the retrieved one or more RVs (870). Combination and decoding of RVs may be performed using any method of combining and decoding data, many of which are known in the art.

Figure 9:
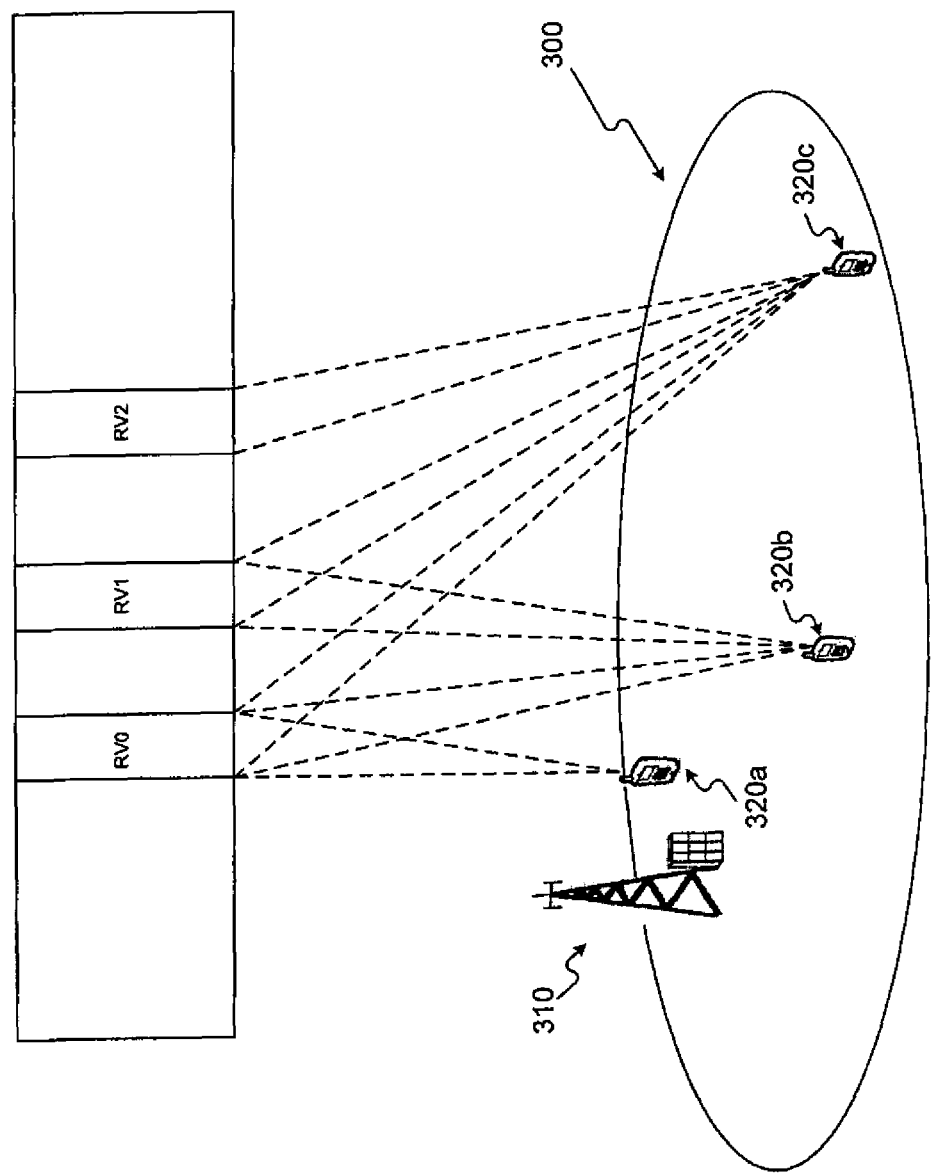
FIG. 9 is a diagram illustrating the exemplary PTM transmission and reception of FIG. 8, consistent with certain disclosed embodiments.

FIG. 9 shows an exemplary diagram of wireless communication system 300 employing the embodiment disclosed above in connection with FIG. 8. As discussed above in connection with 810, TD 310 may encode and transmit a set of RVs, e.g., RV0, RV1, and RV2, and transmit the set of RVs contiguously and/or non-contiguously. Each of SSs 320a, 320b, and 320c may retrieve a first RV, e.g., RV0. As discussed above in connection with 840, SS 320a may determine that it can correctly decode the PTM information bits using only RV0. However, using the same or different criteria as SS 320a, SSs 320b and 320c may each determine that one or more additional RVs may be required to correctly decode the PTM information bits. In this example, SS 320b and SS 320c may both determine to retrieve at least one additional RV, e.g., RV1. Thus, each of SS 320b and SS 320c may store RV0, retrieve RV1, and combine RV0 and RV1.

Again, using the same or different criteria as SS 320a or the criteria used in the previous iteration of determination, SS 320b and 320c may determine if one or more additional RVs may be required to correctly decode the PTM information bits. Here, SS 320b may determine that one or more additional RVs are not desired, and SS 320b may decode the PTM information bits using RV0 and RV1. SS 320c, however, may determine that at least one additional RV is desired, and may determine to retrieve additional RV2. Thus, SS 320c may store RV1 and RV0, retrieve RV2, and combine RV2 with RV0 and RV1.

Once SS 320c has retrieved RV2, SS 320c may again determine if one or more additional RVs may be required to correctly decode the PTM information bits. In this example, SS 320c may determine that one or more additional RVs are not desired. Thus, SS 320c may decode the PTM information bits using the combination of RV0, RV1, and RV2. When a determination is made to decode the PTM information bits, the combination of PTM data versions may be provided to a decoding unit for decoding.

Figure 10:
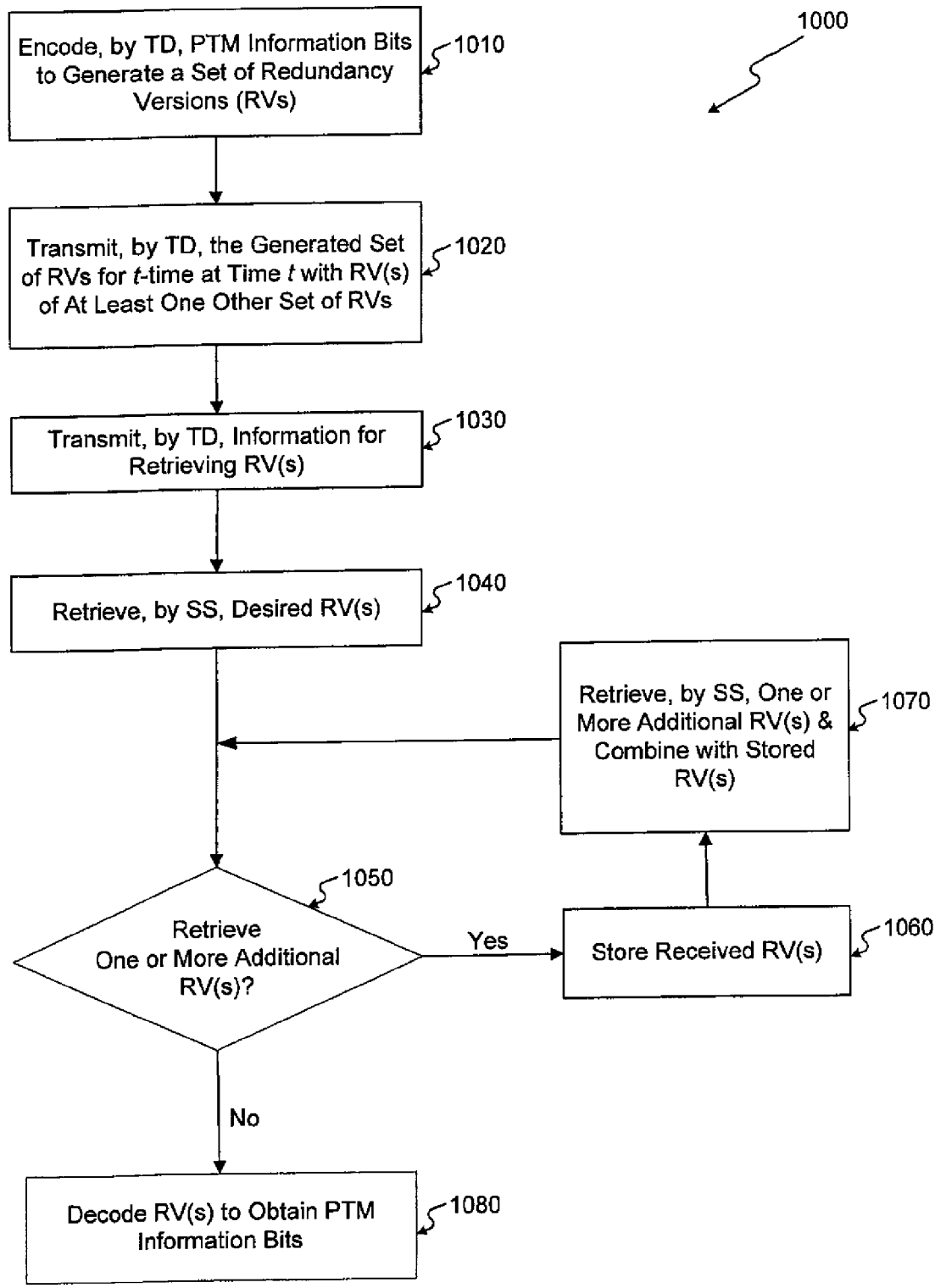
FIG. 10 is a flowchart illustrating an exemplary PTM transmission and reception, consistent with certain disclosed embodiments.

FIG. 10 is an exemplary flowchart 1000 illustrating PTM data transmission in a wireless communication system, such as wireless communication system 300, consistent with certain disclosed embodiments. Specifically, FIG. 10 illustrates an embodiment in which a transmitting device (e.g., TD 310) generates a set of RVs, each RV of the set of RVs corresponding to a transmission time t. In the example of FIG. 10, each receiving device (e.g., SS 320a, SS 320b, SS 320c, etc.) may determine the number of RVs to retrieve based on its channel conditions. In the embodiment of FIG. 10, one or more RVs of the set of RVs for time t may be sent non-contiguously with one another, but contiguously with one or more RVs of a set of RVs corresponding to another transmission time, e.g., a set of RVs corresponding to transmission time t−1, t+1, t−2, t+2, etc. PTM transmissions may include broadcast and multicast transmissions. The RVs may be retrieved from one or more data bursts in a radio frame.

When TD 310 has PTM information bits for PTM transmission, TD 310 may encode the PTM information bits using one or more data recovery schemes to generate a set of RVs (1010), each RV in the set of RVs corresponding to a same transmission time t. TD 310 may, for example, generate three RVs (e.g., RV0($t$), RV1($t$), and RV2($t$)) by passing the PTM data through the IR processes (e.g., CTC encoder, interleaver, puncture, modulator, etc.). Each RV may be modulated by any combination of modulation scheme (e.g., BPSK, QPSK, 16-QAM, 64-QAM, etc.) and coding rate (e.g., ½, ⅓, ⅔, etc.) to provide different levels of robustness for the respective RVs. In some embodiments, each of the RVs may be modulated according to a same modulation scheme and/or coding rate. In other embodiments, one or more of the RVs may have a modulation scheme and/or coding rate that is different than one or more other RVs.

As discussed above in connection with FIG. 6 and FIG. 8, while three RVs are discussed, the number of RVs in a set of RVs may be more or less. In some embodiments, the number of RVs in a set of RVs may be predetermined. In other embodiments, the number of RVs in a set of RVs may be determined dynamically. For example, TD 310 may determine the number of RVs to generate based on one or more transmission and/or channel conditions reported from one or more receiving devices (e.g., SS 320a, SS 320b, SS 320c, etc.). Transmission and/or channel conditions may include, for example, measured signal strength, CQI, SINR, BER, BLER, packet error rate, etc. In some embodiments, the number of OFDMA symbols in a set of RVs may be the same (e.g., the number of OFDMA symbols in RV0($t$) is equal to the number of OFDMA symbols in RV1($t$), etc.). In other embodiments, the number of OFDMA symbols in a set of RVs may be different (e.g., the number of OFDMA symbols in RV0($t$) is not equal to the number of OFDMA symbols in RV1($t$), etc.).

Once TD 310 has encoded and modulated the PTM information bits to achieve a set of RVs, TD 310 may transmit one or more RVs of the set of RVs to one or more receiving devices (e.g., SS 320a, SS 320b, SS 320c, etc.). In one exemplary embodiment, TD 310 may transmit the one or more RVs in a first set of RVs with at least one other RV of a second set of RVs (1020). The RVs may be sent by using TDM and/or FDM. The RVs may all be sent on a same channel or on different channels. The at least one other RV may be from a set of RVs corresponding to PTM information bits that have been generated for transmission at another time, either before or after transmission of the current RV. For example, one or more RVs of a set of RVs generated at time t−1 (e.g., RV0($t$−1), RV1($t$−1), and RV2($t$−1)) may be transmitted along with the currently transmitted RV (e.g., RV0($t$), RV1($t$), and RV2($t$)). Thus, in one exemplary embodiment, TD 310 may transmit the set of RVs for transmission time t contiguously. In another exemplary embodiment, TD 310 may transmit the set of RVs for transmission time t with intervening time intervals. These intervening time intervals may, for example, be of sufficient length to allow one or more receiving SSs 320 to retrieve a first RV, and make a determination that one or more additional RVs are desired in a manner similar to that discussed above in connection with FIGS. 8 and 9. In some embodiments, the RVs may be sent in an order corresponding to their sequence order (e.g., RV0($t$), RV1($t$), RV2($t$), etc.). In other embodiments, the RVs may be sent in an order different than their sequence order (e.g., RV0($t$), RV2($t$), RV1($t$), etc.).

In addition, TD 310 may provide information for each of the one or more receiving devices (e.g., SS 320a, SS 320b, SS 320c, etc.) to locate and retrieve one or more RVs of the set of RVs (1030). The location information may, for example, be found in a MAC header. In some embodiments, the location information may be provided in one or more MAP IEs. In other embodiments, the location information may be provided in multicast control channels. The location information may be included in a same PDU as the RV or in any previously transmitted PDU.

Each SS 320, in turn, may retrieve a desired RV associated with transmission time t (1040). In some embodiments, the RV that an SS 320 may desire to retrieve may be predetermined. In other embodiments, a determination of the RV that an SS 320 may desire to retrieve may be made based on one or more transmission and/or channel conditions associated with that particular SS 320, including, for example, CRC, measured signal strength, CQI, SINR, BER, BLER, packet error rate, etc.

Once SS 320 has retrieved the desired RV associated with transmission time t, SS 320 may evaluate the data and determine if one or more additional RVs for transmission time t are desired (1050). The determination of whether to retrieve one or more additional RVs for transmission time t may be made based on one or more criteria, including, for example, error detection methods, CRC, radio link condition, etc. The determination may be made using the same and/or different transmission and/or channel conditions used previously (e.g., using the same transmission and/or channel conditions as in step 1040, using the same transmission and/or channel conditions as in previously retrieved PTM data, etc.). In some embodiments, a determination to retrieve one or more additional RVs may be made because the data cannot be correctly decoded.

If SS 320 determines that one or more additional RVs for transmission time t are desired (1050, Yes), SS 320 may store the retrieved RV(s) for transmission time t in a memory associated with SS 320, e.g., storage 314 (1060), and may retrieve one or more additional RVs for transmission time t when SS 320 retrieves the first RV for transmission time t+1 (e.g., RV0($t$+1)). (1070). In addition, SS 320 may combine the additional one or more RVs for transmission time t with the stored RV(s) for transmission time t.

After the one or more additional RVs for transmission time t have been retrieved and combined, SS 320 may again make a determination if it desires to retrieve one or more additional RVs for transmission time t (1050). In addition, SS 320 may make a determination if it desires to retrieve one or more additional RVs for transmission time t+1. The determination of whether to retrieve one or more additional RVs, for transmission times t and/or t+1, may be made based on one or more criteria, including, for example, error detection methods, CRC, radio link condition, measured signal strength, CQI, SINR, BER, BLER, packet error rate, etc. In one exemplary embodiment, SS 320 may make a determination that one or more additional RVs for a first transmission time t may be desired, while also making a determination that one or more additional RVs for a second transmission time t+1 are not desired. Conversely, SS 320 may make a determination that one or more additional RVs for transmission time t+1 may be desired, while also making a determination that one or more additional RVs for transmission time t are not desired.

Once SS 320 determines that one or more additional RVs are not desired for transmission time t (1050, No), SS 320 may decode the retrieved one or more RVs for transmission time t (1080). Combination and decoding of RVs may be performed using any method of combining and decoding data, many of which are known in the art.

Figure 11:
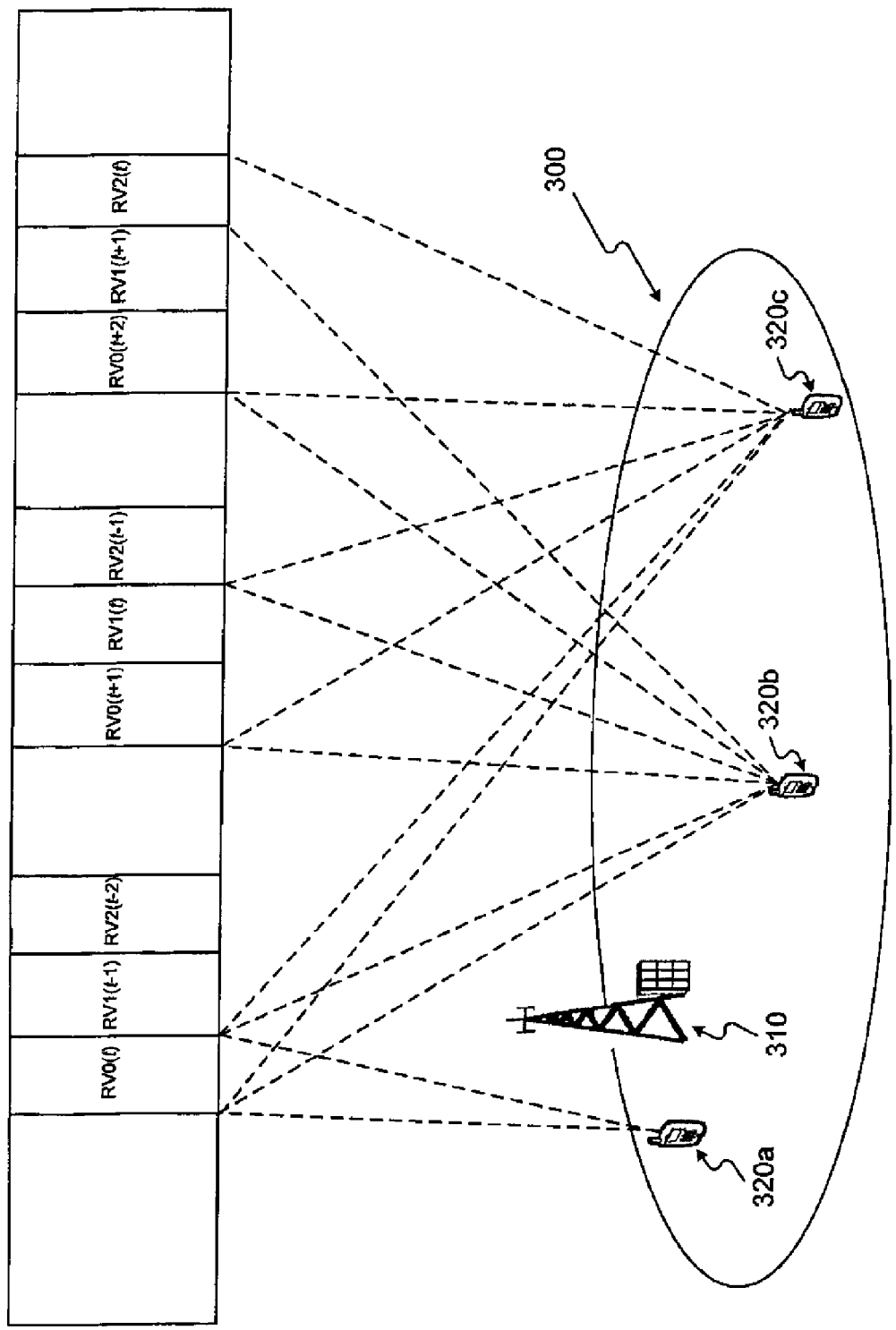
FIG. 11 is a diagram illustrating the exemplary PTM transmission and reception of FIG. 10, consistent with certain disclosed embodiments.

FIG. 11 shows an exemplary diagram of wireless communication system 300 employing the embodiment disclosed above in connection with FIG. 10. As discussed above in connection with 1010, TD 310 may encode and transmit a set of RVs for transmission time t, i.e., RV0(t), RV1(t), and RV2(t). In the example of FIG. 11, TD 310 may transmit the RVs in the set of RVs for transmission time t non-contiguously. Using information transmitted by TD 310, each of SSs 320a, 320b, and 320c may retrieve a first RV for transmission time t, e.g., RV0(t). SS 320a may determine that it can correctly decode the PTM information bits using only RV0(t). However, SS 320b and 320c may determine that one or more additional RVs for transmission time t may be required to correctly decode the PTM information bits. As discussed above in connection with 1050, SS 320b and SS 320c may make this determination based on one or more criteria, such as, for example, error detection methods, CRC, radio link condition, measured signal strength, CQI, SINR, BER, BLER, packet error rate, etc.

In this example, SS 320b and SS 320c may both determine to retrieve an additional RV, e.g., RV1(t). Thus, each of SS 320b and SS 320c may store RV0(t), and retrieve RV1(t) while retrieving the first RV for transmission time (t+1), e.g., RV0(t+1). SS 320b and SS 320c may each combine RV0(t) and RV1(t). SS 320b may make a determination that it does not need additional RVs for transmission time t, but does need one or more additional RVs for transmission time t+1. Thus, SS 320b will retrieve a second RV for transmission time t+1, e.g., RV (t+1), while retrieving a first RV for transmission time t+2, e.g., RV0(t+2). In contrast, SS 320c may make a determination that it needs one or more additional RVs for transmission time t. Thus, SS 320c may retrieve RV2(t) while retrieving a second RV for transmission time t+1 (i.e., RV1 (t+1)) and a first RV for transmission time t+2 (i.e., RV0(t+ 2)).

SS 320b and SS 320c may combine and store the retrieved RVs (e.g., RV1(t+1), RV0(t+2), etc.). This process may continue until a determination is made that the PTM information bits for any given time t can be correctly decoded. When a determination is made to decode the combined RVs, the combination of RVs for transmission time t may be provided to a decoding unit connected to SS 320 for decoding.

In this manner, the apparatuses and methods disclosed may be configured transmit and/or receive without the necessity of sending and/or receiving ACKs, NACKs, etc. For example, TD 310 may be configured to transmit and/or retransmit encoded PTM information bits without receiving ACKs, NACKS, etc. Similarly, SS 320 may be configured to receive and decode encoded PTM information bits without sending ACKs, NACKs, etc.

Moreover, the apparatuses and methods disclosed may be configured to selectively receive data modulated and encoded at a level of robustness that allows for successful decoding of the encoded PTM information bits, while minimizing resource usage. In this manner, the disclosed embodiments may reduce signal processing time and improve data traffic flow associated with error detection and retransmission of data in any type of wireless network. Similarly, the methods and apparatus as discussed in connection with the disclosed embodiments may be configured to operate in any transmitting and/or receiving device.

It will be apparent to those skilled in the art that various modifications and variations can be made in the system and method for reception in communication networks. It is intended that the standard and examples be considered as exemplary only, with a true scope of the disclosed embodiments being indicated by the following claims and their equivalents.

What is claimed is:

1. A method for point-to-multipoint transmission in a wireless communication system including a set of receiving devices, comprising:
   encoding, by a transmission device, a plurality of point-to-multipoint data bits to generate a plurality of point-to-multipoint data versions;
   transmitting, to the set of receiving devices, location information for each of the plurality of point-to-multipoint data versions, wherein the location information enables at least one receiving device of the set of receiving devices to receive desired data versions within the plurality of point-to-multipoint data versions; and
   transmitting, to the set of receiving devices, the plurality of point-to-multipoint data versions.

2. The method as in claim 1, further including:
   determining one or more transmission or channel conditions between the transmission device and the set of receiving devices; and
   determining a number of the plurality of data versions to encode based on the determined one or more transmission or channel conditions.

3. The method as in claim 2, wherein determining the number of data versions further includes:
   determining, dynamically, a number of times to encode the plurality of point-to-multipoint data bits; and
   encoding, by the transmission device, the plurality of point-to-multipoint data bits the determined number of times to generate the plurality of point-to-multipoint data versions.

4. The method as in claim 2, wherein determining the number of data versions further includes:
   determining, dynamically, a number of times to encode the plurality of point-to-multipoint data bits, wherein the number of times to encode corresponds to the number of data versions.

5. The method as in claim 2, wherein the one or more transmission or channel conditions include one or more of a measured signal strength, a channel quality indicator, a signal to interference plus noise ratio, a bit error rate, a block error rate, and a packet error rate.

6. The method as in claim 1, wherein encoding the plurality of point-to-multipoint data bits further includes:
   encoding the plurality of point-to-multipoint data bits;
   interleaving the encoded plurality of point-to-multipoint data bits; and
   puncturing the interleaved plurality of point-to-multipoint data bits.

7. The method as in claim 1, wherein the plurality of point-to-multipoint data bits are a first plurality of point-to-multipoint data bits associated with a first transmission time and the plurality of point-to-multipoint data versions are a first plurality of point-to-multipoint data versions, the method further including:
   encoding, by the transmission device, a second plurality of point-to-multipoint data bits to generate a second plurality of point-to-multipoint data versions associated with a second transmission time;
   transmitting, to the set of receiving devices, location information for at least one point-to-multipoint data version of the second plurality of point-to-multipoint data versions and the at least one point-to-multipoint data version of the first plurality of point-to-multipoint data versions, wherein the location information enables the at least one receiving device of the set of receiving devices to receive desired data versions within the at least one point-to-multipoint data version of the second plurality of point-to-multipoint data versions and the at least one point-to-multipoint data version of the first plurality of point-to-multipoint data versions; and
   transmitting, to the set of receiving devices, at least one point-to-multipoint data version of the second plurality of point-to-multipoint data versions with at least one point-to-multipoint data version of the first plurality of point-to-multipoint data versions.

8. The method as in claim 7, further including:
   encoding, by the transmission device, a third plurality of point-to-multipoint data bits to generate a third plurality of point-to-multipoint data versions associated with a third transmission time;
   transmitting, to the set of receiving devices, location information for at least one point-to-multipoint data version of the third plurality of point-to-multipoint data versions and the second at least one point-to-multipoint data version of the second plurality of point-to-multipoint data versions or the second at least one point-to-multipoint data version of the first plurality of point-to-multipoint data versions, wherein the location information enables the at least one receiving device of the set of receiving devices to receive desired data versions within the at least one point-to-multipoint data version of the third plurality of point-to-multipoint data versions and the second at least one point-to-multipoint data version of the second plurality of point-to-multipoint data versions or the second at least one point-to-multipoint data version of the first plurality of point-to-multipoint data versions; and
   transmitting, to the set of receiving devices, at least one point-to-multipoint data version of the third plurality of point-to-multipoint data versions with at least one of a second at least one point-to-multipoint data version of the second plurality of point-to-multipoint data versions or a second at least one point-to-multipoint data version of the first plurality of point-to-multipoint data versions.

9. The method as in claim 1, further including transmitting the plurality of point-to-multipoint data versions contiguously.

10. The method as in claim 1, further including transmitting the plurality of point-to-multipoint data versions non-contiguously.

11. The method as in claim 1, further including performing the encoding using one of an incremental redundancy technique or a chase combining technique.

12. The method as in claim 1, wherein each of the plurality of point-to-multipoint data versions has a different combination of modulation scheme and coding rate.

13. The method as in claim 1, wherein each of the plurality of point-to-multipoint data versions has a same combination of modulation scheme and coding rate.

14. The method as in claim 1, further including transmitting the plurality of point-to-multipoint data versions on a same channel.

15. The method as in claim 1, further including transmitting the plurality of point-to-multipoint data versions on different channels.

16. The method as in claim 1, further including transmitting the plurality of point-to-multipoint data versions by using time division multiplexing.

17. The method as in claim 1, further including transmitting the plurality of point-to-multipoint data versions by using frequency division multiplexing.

18. The method as in claim 1, further including transmitting the plurality of point-to-multipoint data versions by using hybrid time division multiplexing and frequency division multiplexing.

19. An apparatus for point-to-multipoint transmission in a wireless communication system, the apparatus comprising:
   at least one memory to store data and instructions; and
   at least one processor configured to access the at least one memory and, when executing the instructions, to:
      encode a plurality of point-to-multipoint data bits to generate a plurality of point-to-multipoint data versions;
      initiate transmission, to a set of receiving devices, location information for each of the plurality of point-to-multipoint data versions, wherein the location information enables at least one receiving device of the set of receiving devices to receive desired data versions within the plurality of point-to-multipoint data versions; and
      initiate transmission, to the set of receiving devices, the plurality of point-to-multipoint data versions.

20. The apparatus as in claim 19, wherein the at least one processor is further configured to:
   determine one or more transmission or channel conditions between the apparatus and the set of receiving devices; and
   determine the number of data versions to encode based on the determined one or more transmission or channel conditions.

21. The apparatus as in claim 20, wherein when the at least one processor is configured to determine the number of encoded point-to-multipoint data versions, the at least one processor is further configured to:
   determine, dynamically, a number of times to encode the plurality of point-to-multipoint data bits; and
   encode the plurality of point-to-multipoint data bits the determined number of times to generate the plurality of point-to-multipoint data versions.

22. The apparatus as in claim 20, wherein when the at least one processor is configured to determine the number of encoded point-to-multipoint data versions, the at least one processor is further configured to:
  determine, dynamically, a number of times to encode the plurality of point-to-multipoint data bits, wherein the number of times to encode corresponds to the number of data versions.

23. The apparatus as in claim 20, wherein the one or more transmission or channel conditions include at least one of a measured signal strength, a channel quality indicator, a signal to interference plus noise ratio, a bit error rate, a block error rate, and a packet error rate.

24. The apparatus as in claim 19, wherein when the at least one processor is configured to encode the plurality of point-to-multipoint data bits, the at least one processor is further configured to:
  encode the plurality of point-to-multipoint data bits;
  interleave the encoded plurality of point-to-multipoint data bits; and
  puncture the interleaved plurality of point-to-multipoint data bits.

25. The apparatus as in claim 19, wherein the plurality of point-to-multipoint data bits are a first plurality of point-to-multipoint data bits associated with a first transmission time and the plurality of point-to-multipoint data versions are a first plurality of point-to-multipoint data versions, and when the at least one processor is configured to encode the plurality of point-to-multipoint data bits, the at least one processor is further configured to:
  encode a second plurality of point-to-multipoint data bits to generate a second plurality of point-to-multipoint data versions associated with a second transmission time;
  transmit, to the set of receiving devices, location information for at least one point-to-multipoint data version of the second plurality of point-to-multipoint data versions and the at least one point-to-multipoint data version of the first plurality of point-to-multipoint data versions, wherein the location information enables the at least one receiving device of the set of receiving devices to receive desired data versions within the at least one point-to-multipoint data version of the second plurality of point-to-multipoint data versions and the at least one point-to-multipoint data version of the first plurality of point-to-multipoint data versions; and
  transmit, to the set of receiving devices, at least one point-to-multipoint data version of the second plurality of point-to-multipoint data versions with at least one point-to-multipoint data version of the first plurality of point-to-multipoint data versions.

26. The apparatus as in claim 25, wherein the at least one processor is further configured to:
  encode a third plurality of point-to-multipoint data bits to generate a third plurality of point-to-multipoint data versions associated with a third transmission time;
  transmit, to the set of receiving devices, location information for at least one point-to-multipoint data version of the third plurality of point-to-multipoint data versions and the second at least one data version of the second plurality of point-to-multipoint data versions or the second at least one point-to-multipoint data version of the first plurality of point-to-multipoint data versions, wherein the location information enables the at least one receiving device of the set of receiving devices to receive desired data versions within the at least one point-to-multipoint data version of the third plurality of point-to-multipoint data versions and the second at least one data version of the second plurality of point-to-multipoint data versions or the second at least one point-to-multipoint data version of the first plurality of point-to-multipoint data versions; and
  transmit, to the set of receiving devices, at least one point-to-multipoint data version of the third plurality of point-to-multipoint data versions with at least one of a second at least one point-to-multipoint data version of the second plurality of point-to-multipoint data versions or a second at least one point-to-multipoint data version of the first plurality of point-to-multipoint data versions.

27. The apparatus as in claim 19, wherein the at least one processor is further configured to transmit the plurality of point-to-multipoint data versions contiguously.

28. The apparatus as in claim 19, wherein the at least one processor is further configured to transmit the plurality of point-to-multipoint data versions non-contiguously.

29. The apparatus as in claim 19, wherein the at least one processor is further configured to encode the point-to-multipoint data bits using one of an incremental redundancy technique or a chase combining technique.

30. The apparatus as in claim 19, wherein each of the plurality of point-to-multipoint data versions has a different combination of modulation scheme and coding rate.

31. The apparatus as in claim 19, wherein each of the plurality of point-to-multipoint data versions has a same combination of modulation scheme and coding rate.

32. The apparatus as in claim 19, wherein the at least one processor is further configured to transmit the plurality of point-to-multipoint data versions on a same channel.

33. The apparatus as in claim 19, wherein the at least one processor is further configured to transmit the plurality of point-to-multipoint data versions on different channels.

34. The apparatus as in claim 19, wherein the at least one processor is further configured to transmit the plurality of point-to-multipoint data versions by using time division multiplexing.

35. The apparatus as in claim 19, wherein the at least one processor is further configured to transmit the plurality of point-to-multipoint data versions by using frequency division multiplexing.

36. The apparatus as in claim 19, wherein the at least one processor is further configured to transmit the plurality of point-to-multipoint data versions by using hybrid time division multiplexing and frequency division multiplexing.

37. A method for reception of point-to-multipoint transmissions in a wireless communication system including a set of receiving devices, comprising:
  receiving, by a receiving device of the set of receiving devices, location information respectively associated with each of a plurality of point-to-multipoint data versions;
  retrieving, by the receiving device, the plurality of point-to-multipoint data versions using the location information;
  combining the retrieved plurality of point-to-multipoint data versions to generate a combined point-to-multipoint data version; and
  decoding the combined point-to-multipoint data version.

38. The method as in claim 37, wherein decoding the combined point-to-multipoint data version further includes:
  applying at least one of an error detection or error recovery method to the combined point-to-multipoint data version.

39. The method as in claim 37, further including:
  determining, by the receiving device, a number of point-to-multipoint data versions included in the plurality of point-to-multipoint data versions based on a number of previous point-to-multipoint data versions retrieved by the receiving device in one or more previous transmissions.

40. The method as in claim 37, further including:
determining, by the receiving device, one or more transmission or channel conditions between the receiving device and a transmission device; and
determining, by the receiving device, the number of point-to-multipoint data versions included in the plurality of point-to-multipoint data versions based on at least one of one or more transmission or channel conditions and one or more of a modulation scheme and coding rate.

41. The method as in claim 40, wherein determining the one or more transmission or channel conditions further includes:
measuring the one or more transmission or channel conditions.

42. The method as in claim 40, wherein the one or more transmission or channel conditions include at least one of a measured signal strength, a channel quality indicator, a signal to interference plus noise ratio, a bit error rate, a block error rate, or a packet error rate.

43. The method as in claim 37, wherein each of the plurality of point-to-multipoint data versions is an encoded version of point-to-multipoint information bits.

44. The method as in claim 37, further including retrieving the plurality of point-to-multipoint data versions in a sequence order.

45. The method as in claim 37, further including retrieving the plurality of point-to-multipoint data versions in an order other than a sequence order.

46. A wireless device for reception of point-to-multipoint transmissions in a wireless communication system including a set of wireless devices, the wireless device comprising:
at least one memory to store data and instructions; and
at least one processor configured to access the at least one memory and, when executing the instructions, to:
receive location information respectively associated with each of a plurality of point-to-multipoint data versions;
retrieve the plurality of point-to-multipoint data versions using the location information;
combine the retrieved plurality of point-to-multipoint data versions to generate a combined point-to-multipoint data version; and
decode the combined point-to-multipoint data version.

47. The wireless device as in claim 46, wherein when the at least one processor is configured to decode the combined point-to-multipoint data version, the at least one processor is further configured to:
apply at least one of an error detection or error recovery method to the combined point-to-multipoint data version.

48. The wireless device as in claim 46, wherein the at least one processor is further configured to:
determine a number of point-to-multipoint data versions included in the plurality of point-to-multipoint data versions based on a number of previous point-to-multipoint data versions retrieved by the receiving device in one or more previous transmissions.

49. The wireless device as in claim 46, wherein the at least one processor is further configured to:
determine one or more transmission or channel conditions between the wireless device and a transmission device; and
determine a number of point-to-multipoint data versions included in the plurality of point-to-multipoint data versions based on at least one of one or more transmission or channel conditions and one or more of a modulation scheme and coding rate.

50. The wireless device as in claim 49, wherein when the at least one processor is configured to determine one or more transmission or channel conditions, the at least one processor is further configured to:
measure the one or more transmission or channel conditions.

51. The wireless device as in claim 49, wherein the one or more transmission or channel conditions include at least one of a measured signal strength, a channel quality indicator, a signal to interference plus noise ratio, a bit error rate, a block error rate, or a packet error rate.

52. The wireless device as in claim 46, wherein each of the plurality of point-to-multipoint data versions is an encoded version of point-to-multipoint information bits.

53. The wireless device as in claim 46, wherein the at least one processor is further configured to retrieve the plurality of point-to-multipoint data versions in a sequence order.

54. The wireless device as in claim 46, wherein the at least one processor is further configured to retrieve the plurality of point-to-multipoint data versions in an order other than a sequence order.

55. A method for reception of point-to-multipoint transmissions in a wireless communication system including a set of receiving devices, comprising:
retrieving, by a receiving device of the set of receiving devices, a first version of a plurality of point-to-multipoint data packets, wherein the first version is included in a plurality of point-to-multipoint versions;
determining, based on one or more transmission conditions, if one or more second versions of the plurality of point-to-multipoint data packets are to be retrieved, wherein the one or more second versions are included in the plurality of point-to-multipoint versions;
storing, if it is determined to retrieve the one or more second versions, the first version;
retrieving the one or more second versions;
combining the one or more second versions with the first version to generate a combined version; and
decoding the combined version.

56. The method as in claim 55, further including:
determining the first version of the plurality of point-to-multipoint data packets to be retrieved by the receiving device.

57. The method as in claim 55, further including:
applying at least one of an error detection or error recovery method to determine a quantity of the one or more second versions to retrieve.

58. The method as in claim 55, wherein determining if one or more second versions are to be retrieved further includes:
measuring the one or more transmission or channel conditions.

59. The method as in claim 55, wherein the one or more transmission or channel conditions include at least one of a measured signal strength, a channel quality indicator, a signal to interference plus noise ratio, a bit error rate, a block error rate, or a packet error rate.

60. The method as in claim 55, wherein the plurality of point-to-multipoint versions are encoded versions of point-to-multipoint information bits.

61. The method as in claim 55, further including receiving the first version and one or more second versions in a sequence order.

62. The method as in claim 55, further including retrieving the first version and one or more second versions in an order other than a sequence order.

63. A wireless device for reception of point-to-multipoint transmissions in a wireless communication system, the wireless device comprising:
- at least one memory to store data and instructions; and
- at least one processor configured to access the at least one memory and, when executing the instructions, to:
    - retrieve a first version of a plurality of point-to-multipoint data packets, wherein the first version is included in a plurality of point-to-multipoint versions;
    - determine, based on one or more transmission or channel conditions, if one or more second versions of the plurality of point-to-multipoint data packets are to be retrieved, wherein the one or more second versions are included in the plurality of point-to-multipoint versions;
    - store, if it is determined to retrieve the one or more second versions, the first version in the at least one memory;
    - retrieve the one or more second versions;
    - combine the one or more second versions with the first version to generate a combined point-to-multipoint version; and
    - decode the combined point-to-multipoint version.

64. The wireless device as in claim 63, wherein the at least one processor is further configured to:
- determine the first version of the plurality of point-to-multipoint data packets to be retrieved by the receiving device.

65. The wireless device as in claim 63, wherein the at least one processor is further configured to:
- apply at least one of an error detection or error recovery method to determine a number of the one or more second versions to retrieve.

66. The wireless device as in claim 63, wherein when the at least one processor is configured to determine if one or more second versions are to be retrieved, the at least one processor is further configured to:
- measure the one or more transmission or channel conditions.

67. The wireless device as in claim 63, wherein the one or more transmission or channel conditions include at least one of a measured signal strength, a channel quality indicator, a signal to interference plus noise ratio, a bit error rate, a block error rate, or a packet error rate.

68. The wireless device as in claim 63, wherein the plurality of point-to-multipoint versions are encoded versions of point-to-multipoint information bits.

69. The wireless device as in claim 63, wherein the at least one processor is further configured to retrieve the first version and one or more second versions in a sequence order.

70. The wireless device as in claim 63, wherein the at least one processor is further configured to retrieve the first version and one or more second versions in an order other than a sequence order.

\* \* \* \* \*